(12) United States Patent
Acero et al.

(10) Patent No.: US 7,519,531 B2
(45) Date of Patent: Apr. 14, 2009

(54) SPEAKER ADAPTIVE LEARNING OF RESONANCE TARGETS IN A HIDDEN TRAJECTORY MODEL OF SPEECH COARTICULATION

(75) Inventors: Alejandro Acero, Bellevue, WA (US); Dong Yu, Kirkland, WA (US); Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 11/093,833

(22) Filed: Mar. 30, 2005

(65) Prior Publication Data

US 2006/0229875 A1 Oct. 12, 2006

(51) Int. Cl.
*G10L 19/06* (2006.01)

(52) U.S. Cl. .................. 704/209; 704/255
(58) Field of Classification Search ............. 704/209, 704/255
See application file for complete search history.

(56) References Cited

U.S. PATENT DOCUMENTS

| | | | | |
|---|---|---|---|---|
| 5,640,490 | A * | 6/1997 | Hansen et al. ............. | 704/254 |
| 5,666,466 | A * | 9/1997 | Lin et al. ................... | 704/246 |
| 6,182,037 | B1 * | 1/2001 | Maes ........................ | 704/247 |
| 6,236,963 | B1 * | 5/2001 | Naito et al. ................ | 704/241 |
| 6,243,677 | B1 * | 6/2001 | Arslan et al. ............... | 704/244 |
| 6,442,519 | B1 * | 8/2002 | Kanevsky et al. .......... | 704/243 |
| 6,470,308 | B1 * | 10/2002 | Ma et al. ................... | 704/201 |
| 6,618,699 | B1 | 9/2003 | Lee et al. | |
| 6,697,778 | B1 * | 2/2004 | Kuhn et al. ................ | 704/243 |
| 7,050,975 | B2 | 5/2006 | Deng et al. | |
| 7,117,148 | B2 | 10/2006 | Droppo et al. | |
| 7,206,741 | B2 | 4/2007 | Deng et al. | |
| 7,409,346 | B2 | 8/2008 | Acero et al. .............. | 704/254 |
| 2006/0074676 | A1 | 4/2006 | Deng et al. | |
| 2006/0100862 | A1 | 5/2006 | Deng et al. | |
| 2006/0200351 | A1 | 9/2006 | Acero et al. | |

OTHER PUBLICATIONS

Deng et al., L., "A structured Speech Model with Continuous Hidden Dynamics and Prediction-Residual Training for Tracking Vocal Tract Resonances," IEEE Proc. ICASSP, vol. I, pp. 557-560, May 2004.

(Continued)

*Primary Examiner*—Michael N Opsasnick
(74) *Attorney, Agent, or Firm*—John D. Veldhuis-Kroeze; Westman, Champlin & Kelly, P.A.

(57) ABSTRACT

A computer-implemented method is provided for training a hidden trajectory model, of a speech recognition system, which generates Vocal Tract Resonance (VTR) targets. The method includes obtaining generic VTR target parameters corresponding to a generic speaker used by a target selector to generate VTR target sequences. The generic VTR target parameters are scaled for a particular speaker using a speaker-dependent scaling factor for the particular speaker to generate speaker-adaptive VTR target parameters. This scaling is performed for both the training data and the test data, and for the training data, the scaling is performed iteratively with the process of obtaining the generic targets. The computation of the scaling factor makes use of the results of a VTR tracker. The speaker-adaptive VTR target parameters for the particular speaker are then stored in order to configure the hidden trajectory model to perform speech recognition for the particular speaker using the speaker-adaptive VTR target parameters.

18 Claims, 12 Drawing Sheets

OTHER PUBLICATIONS

Deng et al., L., "A Quantitative Model for Formant Dynamics and Contextually Assimilated Reduction in Fluent Speech", ICSLP 2004, Jeju, Korea, 2004.

Eide et al., E., "A Parametric Approach to Vocal Tract Length Normalization," IEEE Proc. ICASSP, pp. 346-348, 1996.

Lee, et al., L., "A Frequency Warping Approach to Speaker Normalization," IEEE Transactions on Speech and Audio Processing, vol. 6, No. 1, pp. 49-60, Jan. 1998.

Ma et al., J., "Efficient Decoding Strategies for Conversational Speech Recognition Using a Constrained Nonlinear State-Space Model," IEEE Transactions on Speech and Audio Processing, vol. 11, No. 6, pp. 590-602, Nov. 2003.

Wang et al., W., "The Use of a Linguistically Motivated Language Model in Conversational Speech Recognition," IEEE Proceedings of International Conference on Acoustics, Speech and Signal Proceedings, vol. 1, pp. 261-264, May 2004.

Welling et al., L., "A Study on Speaker Normalization Using Vocal Tract Normalization and Speaker Adaptive Training", IEEE Proceedings of ICASSP, vol. 2, pp. 797-800, May 1998.

Zhan et al., P., "Speaker Normalization Based on Frequency Warping," IEEE Proceedings of ICASSP, pp. 1039-1042, 1997.

Zhan et al., P., "Vocal Tract Length Normalization for Large Vocabulary Continuous Speech Recognition", CMU-CS-97-148, Carnegie Mellon University, Pittsburgh, PA, May 1997.

Zhou et al., J., "Coarticulation Modeling by Embedding a Target-Directed Hidden Trajectory Model into HMM," IEEE Proceedings of ICASSP, vol. I, pp. 744-747, Apr. 2003.

U.S. Appl. No. 11/069,474, filed Mar. 1, 2005 entitled "Two-Stage Implementation for Phonetic Recognition Using a Bi-Direction Target-Filtering Model of Speech Coarticulation and Reduction".

U.S. Appl. No. 11/071,904, filed Mar. 1, 2005 entitled "Acoustic Models with Structured Hidden Dynamics with Integration Over Many Possible Hidden Trajectories".

U.S. Appl. No. 10/944,262, filed Sep. 17, 2004 entitled "Quantitative Model for Formant Dynamics and Contextually Assimilated Reduction in Fluent Speech".

Lindblom, B., "Spectrographic Study of Vowel Reduction," The Journal of the Acoustical Society of America, vol. 35, No. 11, pp. 1773-1781, Nov. 1963.

van Santen, J. P. H, "Contextual effects on vowel reduction," Speech Communication, vol. 11, No. 6, pp. 513-546, Dec. 1992.

van Bergem, D. R., "Acoustic vowel reduction as a function of sentence accent, word stress and word class," Speech Communications, vol. 12, No. 1, pp. 1-23, Mar. 1993.

Moon et al., S., "Interaction between duration, context, and speaking style in English stressed vowels," The Journal of the Acoustical Society of America, vol. 96, No. 1, pp. 40-55, Jul. 1994.

Pitermann, M., "Effect of speaking rate and contrastive stress on formant dynamics and vowel perception," The Journal of the Acoustical Society of America, vol. 107, No. 6, pp. 3425-3437, Jun. 2000.

Hertz, S. R., "Streams, phones, and transitions: Toward a new phonological and phonetic model of formant timing," Journal of Phonetics, vol. 19, No. 1, pp. 91-109, Jan. 1991.

Wouters et al., J., "Control of Spectral Dynamics in Concatenative Speech Synthesis," IEEE Transactions on Speech and Audio Processing, vol. 9, No. 1, pp. 30-38, Jan. 2001.

Deng, L., "Computational Models for Speech Production," in Computational Models of Speech Pattern Processing, (K. Ponting Ed.), Berlin: Springer, pp. 199-213, 1999.

Ma et al., J. Z., "Target-Directed Mixture Dynamic Models for Spontaneous Speech Recognition," IEEE, Transactions on Speech and Audio Processing, vol. 12, No. 1, pp. 47-58, Jan. 2004.

Deng, Li et al., Speech Processing—A Dynamic and Optimization-Oriented Approach, chapter 13, Marcel Dekker Inc., New York, NY, 2003.

Deng et al., L., "A Bi-Directional Target-Filtering Model of Speech Coarticulation and Reduction: Two-Stage Implementation for Phonetic Recognition", IEEE Transactions of Speech and Audio Processing, Jun. 2004.

Deng, et al., L., "Tracking Vocal Tract Resonances Using a Quantized Nonlinear Function Embedded in a Temporal Constraint," IEEE Transactions on Speech and Audio Processing, Mar. 2004.

Deng, L. "A dynamic, feature-based approach to the interface between phonology and phonetics for speech modeling and recognition," Speech Communication, vol. 24, No. 4, pp. 299-323, Mar. 1998.

Ostendorf et al., M., "From HMM's to Segment Models: A Unified View of Stochastic Modeling for Speech Recognition" IEEE Transactions on Speech and Audio Processing, vol. 4, No. 5, pp. 360-378, Sep. 1996.

Bridle et al., J. S., "An Investigation of Segmental Hidden Dynamic Models of Speech Coarticulation for Automatic Speech Recognition," Final Report of a Project at the 1998 Workshop on Language Engineering, Center for Language and Speech Processing, John Hopkins University, pp. 1-61, 1998.

Sun et al., J., "An Overlapping-Feature Based Phonological Model Incorporating Linguistic Constraints: Applications to Speech Recognition," Journal of the Acoustic Society of America, vol. 111, No. 2, pp. 1086-1101, Feb. 2002.

Bilmes, J., "Graphical Models and Automatic Speech Recognition", Mathematical Foundations of Speech and Language Processing, Springer-Verlag New York, Inc., pp. 191-245, 2004.

Chelba et al., C., "Structured language modeling", Computer Speech and Language, vol. 14, pp. 283-332, Oct. 2000.

Deng, L., "A generalized hidden Markov model with state-conditioned trend functions of time for the speech signal", Signal Processing, vol. 27, pp. 65-78, 1992.

Deng, L., "Switching Dynamic System Models for Speech Articulation and Acoustics", Mathematical Foundations of Speech and Language Processing, Springer-Verlag New York, Inc., pp. 115-134, 2004.

Deng et al., L., "Context-dependent Markov model structured by locus equations: Applications to phonetic classification", The Journal of the Acoustical Society of America, vol. 96, No. 4, pp. 2008-2025, Oct. 1994.

Ficus, J. G., "A Post-Processing System to Yield Reduced Word Error Rates: Recognizer Output Voting Error Reduction", 1997 IEEE Workshop on Automatic Speech Recognition and Understanding Proceedings, pp. 347-354, 1997.

Gao et al., Y., "Multistage Coarticulation Model Combining Articulatory, Formant and Cepstral Features", Proceedings of the ICSLP, vol. 1, pp. 25-28, 2000.

Gay, T. "Effect of speaking rate on vowel formant movements", The Journal of the Acoustical Society of America, vol. 63, No. 1, pp. 223-230, Jan. 1978.

Kamm et al., T., "Vocal tract normalization in speech recognition: Compensating for systematic speaker variability", The Journal of the Acoustical Society of America, vol. 97, No. 5, Pt. 2, pp. 3246-3247, May 1995.

Wegmann et al., S., "Speaker Normalization on Conversational Telephone Speech", IEEE International Conference on Acoustics, Speech, and Signal Processing Conference Proceedings, pp. 339-341, May 1996.

Ma et al., J., "A mixed-level switching dynamic system for continuous speech recognition", Computer Speech and Language, vol. 18, pp. 49-65, 2004.

Zweig, G., "Bayesian network structures and inference techniques for automatic speech recognition", Computer Speech and Language, vol. 17, pp. 173-193, 2003.

Bilmes, J. "Buried Markov models: a graphical-modeling approach to automatic speech recognition", Computer Speech and Language, vol. 17, pp. 213-231, 2003.

Siu et al., M., "Parametric Trajectory Mixtures for LVCSR", 5th International Conference on Spoken Language Processing, Sydney, Australia, pp. 3269-3272, 1998.

Holmes et al., W. J., "Probabilistic-trajectory segmental HMMs", Computer Speech and Language, vol. 13, pp. 3-37, 1999.

Klatt, D. H., "Software for a cascade/parallel formant synthesizer", Journal of the Acoustical Society of America, vol. 67, No. 3, pp. 971-995, Mar. 1980.

Lindblom, B., "Explaining Phonetic Variation: A Sketch of the H & H Theory", Speech Production and Speech Modelling, Kluwer Academic Publishers, pp. 403-439, 1990.

Hajic et al., J., "Core Natural Language Processing Technology Applicable to Multiple Languages", Final Report for Center for Language and Speech Processing, John Hopkins University, 1998.

Pols, L C. W., "Psycho-acoustics and Speech Perception", Computational Models of Speech Pattern Processing, Springer-Verlag Berlin Heidelberg, pp. 10-17, 1999.

Rose et al., R. C., "The potential role of speech production models in automatic speech recognition", Journal of the Acoustical Society of America, vol. 99, No. 3, pp. 1699-1709, Mar. 1996.

Stevens, K. N., "On the quantal nature of speech", Journal of Phonetics, vol. 17, 1989.

Digalakis et al., V., "Rapid Speech Recognizer Adaptation to New Speakers", John Hopkins University, Oct. 1998.

* cited by examiner

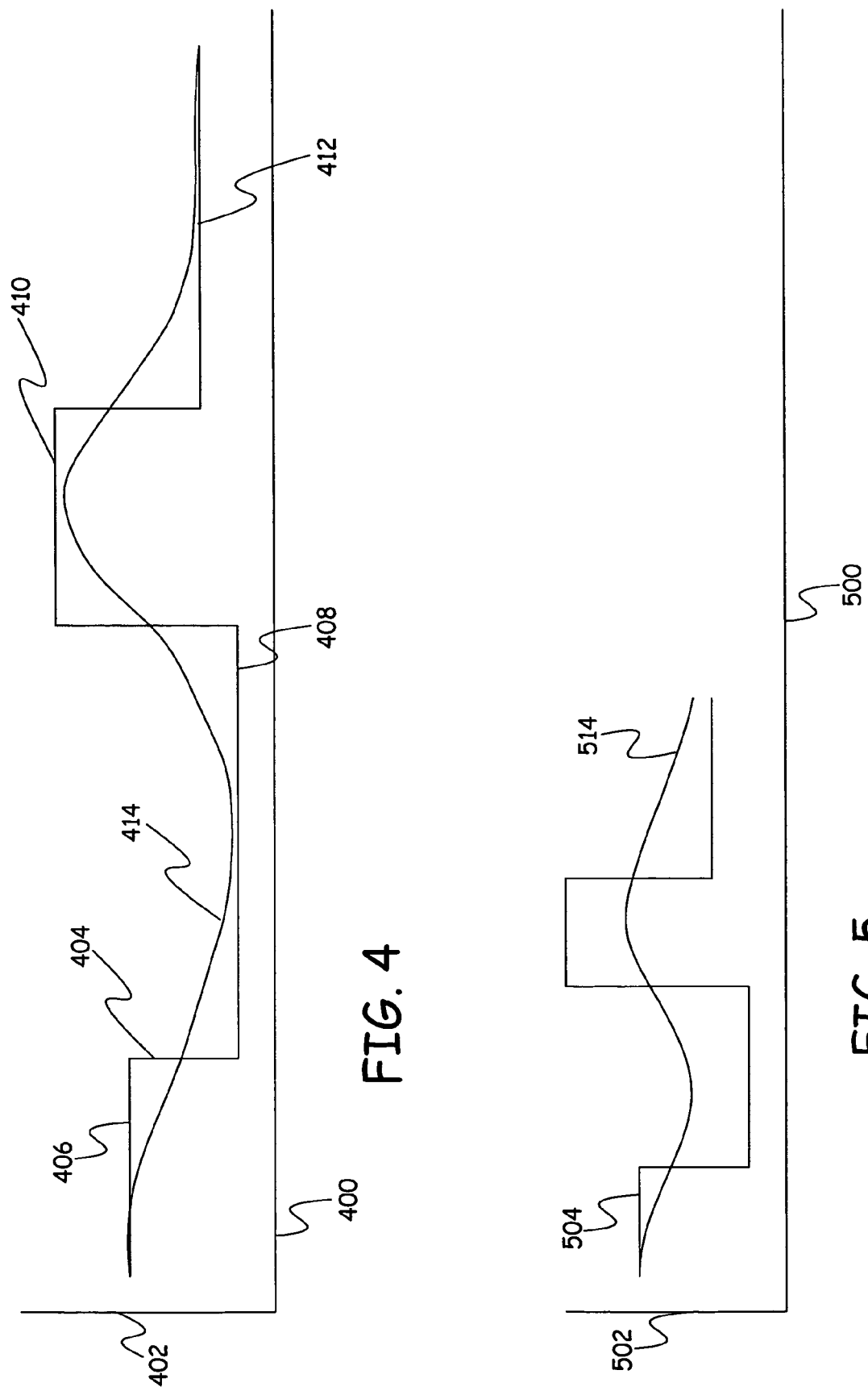

SPEAKER ADAPTIVE LEARNING OF RESONANCE TARGETS IN A HIDDEN TRAJECTORY MODEL OF SPEECH COARTICULATION

BACKGROUND OF THE INVENTION

The present invention relates to models of speech. In particular, the present invention relates to vocal tract resonance (VTR) models of structured speech.

In recent years, much research in spoken language technology has been devoted to incorporating structures of human speech and language into statistical speech recognition systems. Researchers have explored the approaches of using the hidden structure of speech in the human speech generation process, either implicitly or explicitly. One key component of these hidden dynamic modeling approaches is a target-filtering operation in some non-observable (i.e., hidden) domain.

Human speech contains spectral prominences or VTRs. These VTRs carry a significant amount of the information contained in human speech. In the past, attempts have been made to model the VTRs associated with particular phonetic units, such as phonemes, using discrete state models such as a Hidden Markov Model. Such models have been less than ideal, however, because they do not perform well when the speaking rate increases or the articulation effort of the speaker decreases. Research into the behavior of VTRs during speech indicates that one possible reason for the difficulty of conventional Hidden Markov Model based systems in handling fluent speech is that during fluent speech the static VTR values and hence the static acoustic information for different classes of phonetic units become very similar as the speaking rate increases or the articulation effort decreases. Although this phenomenon, known as reduction, has been observed in human speech, an adequate and quantitative model for predicting such behavior in VTR tracts has been needed Recently, a bi-directional target filtering approach to modeling speech coarticulation and context assimilated reduction has been developed. This hidden trajectory model functionally achieves both anticipatory and regressive coarticulation, while leaving the phonological units as the linear phonemic sequence and bypassing the use of more elaborated nonlinear phonological constructs. One key set of parameters in the hidden trajectory model is VTR targets, which are specific to each phone but are context independent.

How to determine the values of these parameters is important to the success of applying the model to speech recognition. The simplest way is to train a single set of VTR targets for all the speakers; i.e., in a speaker-independent manner. In this case, the training averages out the VTR targets' variability over all speakers in the training set. However, VTRs and their targets are related to the vocal tract length of the speaker, and hence they vary among speakers. A single set of VTR targets can produce the VTR trajectories that typically match well with data for some speakers, but not for other speakers. An improved method of determining values of these resonance targets would be therefore needed.

SUMMARY OF THE INVENTION

A new speaker-adaptive learning algorithm is provided for a hidden trajectory model of speech coarticulation and reduction. Central to this model is the process of bi-directional (forward and backward) filtering of the vocal tract resonance (VTR) target sequence. The VTR targets are key parameters of the model that control the hidden VTR's dynamic behavior and the subsequent acoustic properties (those of the cepstral vector sequence). Two techniques for training these target parameters are provided: 1) speaker-independent training that averages out the target variability over all speakers in the training set; and 2) speaker-adaptive training that takes into account the variability in the target values among individual speakers. The adaptive learning is applied also to adjust each unknown test speaker's target values towards their true values. All the learning algorithms make use of the results of accurate VTR tracking. Presented are details of the learning algorithms and the analysis results comparing speaker-independent and speaker-adaptive learning. Also described are TIMIT phone recognition experiments and results, demonstrating consistent superiority of speaker adaptive learning over speaker-independent one measured by the phonetic recognition performance.

In accordance with some embodiments of the present invention, a computer-implemented method is provided for training a hidden trajectory model, of a speech recognition system, which generates Vocal Tract Resonance (VTR) targets. The method includes obtaining generic VTR target parameters corresponding to a generic speaker used by a target selector to generate VTR target sequences. The generic VTR target parameters are scaled for a particular speaker using a speaker-dependent scaling factor for the particular speaker to generate speaker-adaptive VTR target parameters. The speaker-adaptive VTR target parameters for the particular speaker are then stored in order to configure the hidden trajectory model to perform speech recognition for the particular speaker using the speaker-adaptive VTR target parameters. The steps can be iteratively performed to improve the speaker-adaptive VTR target parameters for the particular speaker.

Other features and benefits that characterize embodiments of the present invention will be apparent upon reading the following detailed description and review of the associated drawings.

BRIEF DESCRIPTION OF THE DRAWINGS

FIG. 4 provides a graph of a target sequence for a VTR and a predicted VTR trajectory using a first VTR model of the present invention.

FIG. 5 provides a graph of a target sequence with shorter durations than FIG. 4 and a corresponding predicted VTR trajectory using the VTR model of the present invention.

DETAILED DESCRIPTION OF ILLUSTRATIVE EMBODIMENTS

I. Exemplary Computing Environments and Introduction

A. Exemplary Computing Environments

Figure 1:
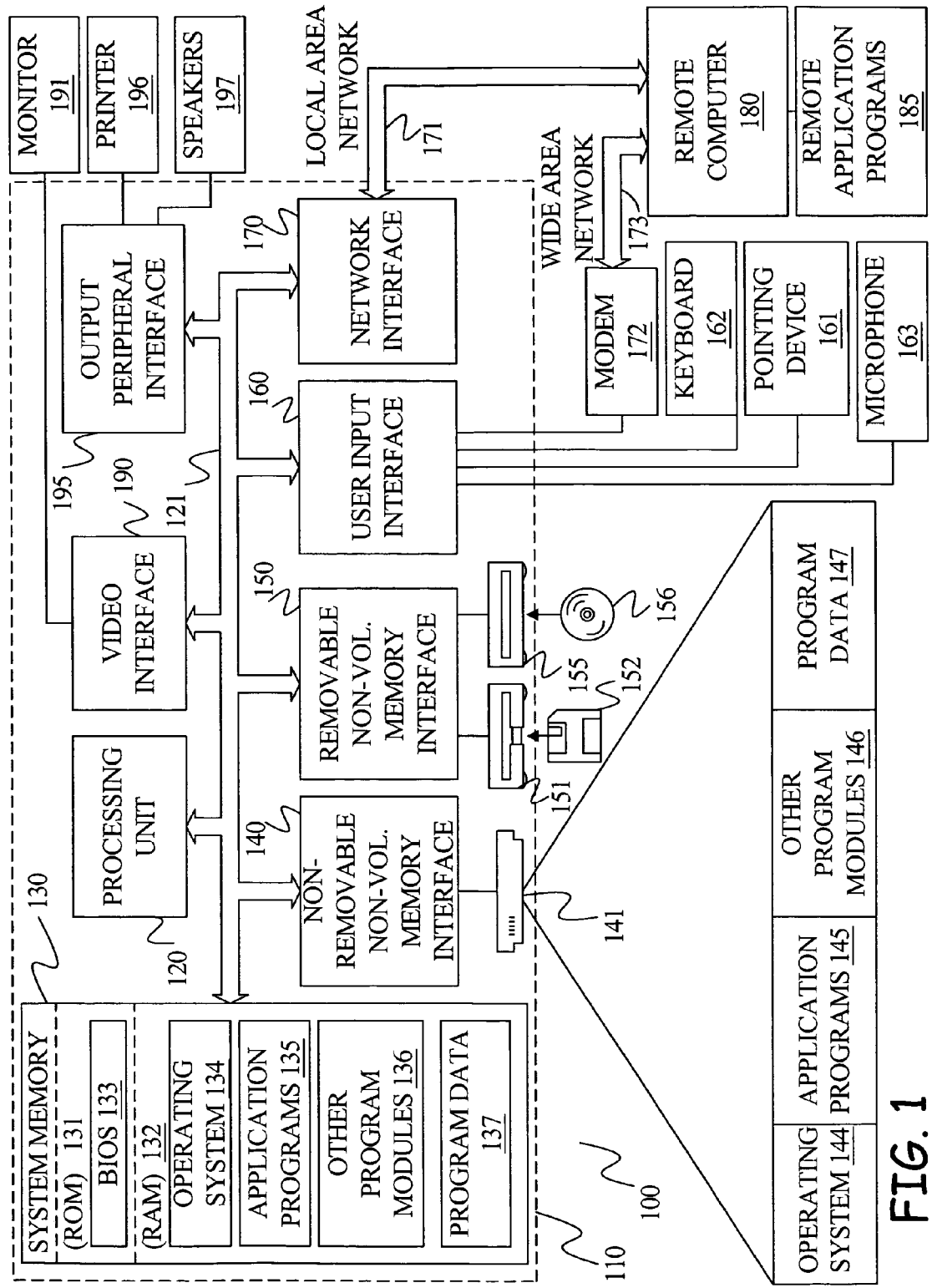
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
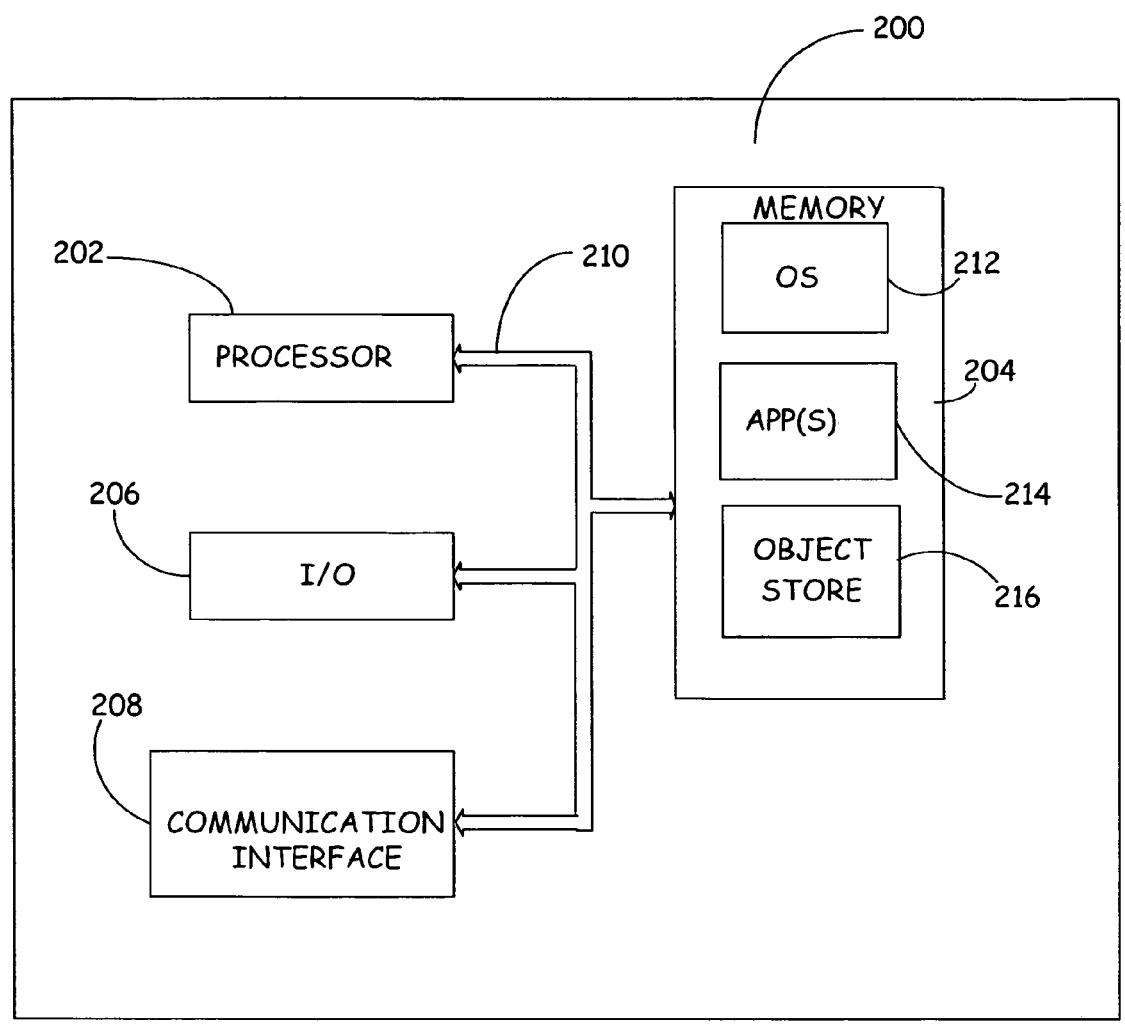
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

B. Introduction

As noted previously, a bi-directional target filtering approach to modeling speech coarticulation and context assimilated reduction has been developed. This hidden trajectory model functionally achieves both anticipatory and regressive coarticulation, while leaving the phonological units as the linear phonemic sequence and bypassing the use of more elaborated nonlinear phonological constructs. The present invention extends these concepts and presents a significantly simpler finite-impulse-response (FIR) filter implementation for the hidden trajectory model in the specific domain of vocal tract resonances (VTRs), which coincide with formants in vocalic regions of speech. The hidden resonances are mapped to observable cepstra as the acoustic parameters using a parameter-free analytical function (in contrast to neural networks), offering significant advantages in model implementation and in constructing automatic recognition systems that incorporate the speech structure.

One key set of parameters in the hidden trajectory model is the VTR targets, which are specific to each phone but are context independent. How to determine the values of these parameters is important to the success of applying the model to speech recognition. As noted previously, the simplest way is to train a single set of VTR targets for all the speakers; i.e., in a speaker-independent manner. In this case, the training averages out the VTR targets' variability over all speakers in the training set. However, VTRs and their targets are related to the vocal tract length of the speaker, and hence they vary among speakers. A single set of VTR targets can produce the VTR trajectories that typically match well with data for some speakers, but not for other speakers. In accordance with embodiments of the present invention, a new speaker-adaptive training algorithm is disclosed that takes into account the VTR target variability among speakers. In essence, the algorithm makes use of the results of a high-accuracy VTR tracking technique that provides the information about the relative vocal tract lengths between a generic speaker (averaged over all speakers in the training set) and a specific speaker in either the training or test data. This philosophy is similar to the vocal tract length normalization (VTLN) techniques developed in the past for normalizing acoustic variabilities among speakers. A new concept of the algorithms or methods of the present invention is to apply such relative vocal tract length estimates directly to achieve accurate estimates of the VTR targets in hidden trajectory modeling.

The inventive concepts, as well as supporting information, are disclosed in the following sections in this manner. In Section II, an overview of the hidden trajectory model formulated in the bi-directional FIR-based target filtering framework is provided. In Section III, the basic, speaker-independent training technique for VTR target parameter estimation is derived and described. The more effective, speaker-adaptive learning algorithm of the present invention that adjusts the VTR target parameters for each individual speaker is presented in Section IV, where the issues of how to obtain the scaling factor and how to use the scaling factor are addressed. In Section V, analysis and phone recognition experiments and results based on TIMIT (Texas Instruments—Massachusetts Institute of Technology) database are shown, providing evidence for the effectiveness of the speaker-adaptive learning technique.

II. Hidden Trajectory Model: An Overview

The hidden trajectory model presented here comprises two stages. In Stage I, the model converts the VTR target sequence to the VTR trajectory by using the phone sequence hypothesis and the boundaries. In Stage II, the model converts the VTR trajectory into the cepstral trajectory with sub-phone dependent bias parameters. These two stages are now described in more detail.

In the past, the failure of Hidden Markov Models to perform well on speech signals with high speaking rates or with low speaking effort has often been attributed to a lack of training data for these types of speech. The present inventors, however, have discovered that it is likely that even with more training data for these types of speech, Hidden Markov Models will still not be able to recognize speech with the desired amount of accuracy. The reason for this is that at high speaking rates the static VTR patterns and hence the static acoustic information (e.g. cepstra) for different vowel sounds begin to converge if only isolated or "static" portions of the speech signal are examined when making a recognition decision.

Figure 3:
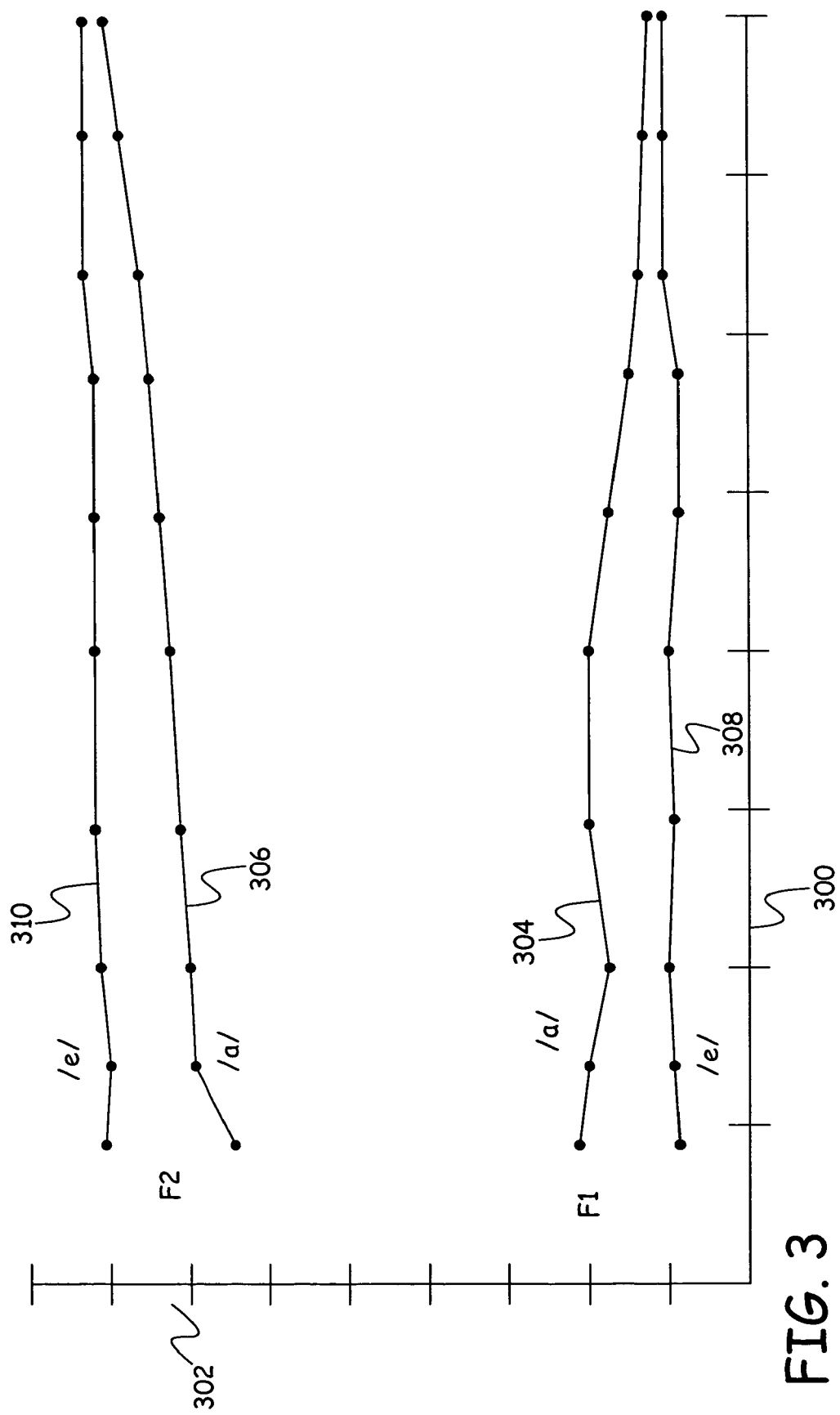
FIG. 3 provides a graph of observed VTR values for two different vowel sounds as speaking rate increases.

This convergence of the VTR values for different vowel sounds is referred to as static confusion. FIG. 3 provides a diagram showing that as the speaking rate increases, VTRs for two different vowel sounds begin to converge. In particular, in FIG. 3, the speaking rate is shown on horizontal axis 300 and the frequency of the first and second VTRs is shown on vertical axis 302. In FIG. 3, speaking rate increases from left to right and frequency increases from the bottom to the top. The value of the first VTR and the second VTR for the vowel sound /a/ are shown by lines 304 and 306, respectively. The values of the first and second VTR for the vowel sound /e/ are shown by lines 308 and 310, respectively.

As can be seen in FIG. 3, the first and second VTRs for the vowel sounds /a/ and /e/ are much more separated at lower speaking rates than at higher speaking rates. Because of this, at higher speaking rates, it is more difficult for the speech recognition system to distinguish between the /a/ sound and the /e/ sound.

The present invention provides a model for VTRs, which accurately predicts the static confusion represented by the data of FIG. 3. This model is a result of an interaction between phonetic context, speaking rate/duration, and spectral rate of changes related to the speaking style.

Under the model, a sequence of VTR targets, modeled as step functions, are passed through a finite impulse response (FIR) filter to produce a smooth continuous VTR pattern.

Stage I of the model is a bi-directional filtering process on the VTR target sequence, where each phone is associated with a unique target vector and timing. This gives rise to both forward and backward coarticulation, since it makes the VTR value at each time dependent on not only the current phone's VTR target but also on the VTR targets of the adjacent phones. This filtering process has been found to give quantitative prediction of the magnitude of contextually assimilated reduction and coarticulation.

The filtering operation is implemented by a slowly time-varying, FIR filter characterized by the following non-causal, vector-valued, impulse response function:

$$h_s(k) = \begin{cases} c\gamma_{s(k)}^{-k} & -D < k < 0 \\ c & k = 0 \\ c\gamma_{s(k)}^{k} & 0 < k < D \end{cases} \quad \text{Equation 1}$$

where k represents time frame, typically with a length of 10 msec each, $\gamma_{s(k)}$ is the stiffness parameter vector, one component for each VTR order. Each component of the stiffness vector is a positive real value between zero and one. The subscript s(k) in $\gamma_{s(k)}$ indicates that the stiffness vector is dependent on the segment state s(k) which varies over time. Parameter D is the unidirectional length of the impulse response, representing the temporal extent of coarticulation in the temporal direction, assumed for simplicity to be equal in length for the forward direction (anticipatory coarticulation) and the backward direction (regressive coarticulation).

In equation 1, k=0 represents a current time point, k less than zero represents past time points, and k greater than zero represents future time points. Thus, in the impulse response of Equation 1, it is assumed for simplicity that the impulse response is symmetric such that the extent of coarticulation in the forward direction is equal to the extent of coarticulation in the backward direction. In other words, the impulse response is symmetric with respect to past time points and future time points. In other embodiments, the impulse response is not symmetrical. In particular, for languages other than English, it is sometimes beneficial to have a nonsymmetrical impulse response for the FIR filter.

In Equation 1, c is the normalization constant to ensure that the filter weights add up to one. This is essential for the model to produce target undershooting, instead of overshooting. To determine c, one can require that the filter coefficients sum to one:

$$\sum_{k=-D}^{D} h_s(k) = c \sum_{k=-D}^{D} \gamma_{s(k)}^{|k|} = 1. \quad \text{Equation 2}$$

For simplicity, the assumption is made that over the temporal span $-D \leq k \leq D$, the stiffness parameter's value stays approximately constant (i.e., $\gamma_{s(k)} \approx \gamma_{s(0)}$). That is, the adjacent segments within the temporal span 2D+1 in length which contribute to the coarticulated home segment have the same stiffness parameter value as that of the home segment. Under this assumption, Equation 2 can be simplified to:

$$c \sum_{k=-D}^{D} \gamma_{s(k)}^{|k|} \approx c[1 + 2(\gamma_{s(0)} + \gamma_{s(0)}^2 + \ldots + \gamma_{s(0)}^D)] = c\frac{1 + \gamma_{s(0)} - 2\gamma_{s(0)}^{D+1}}{1 - \gamma_{s(0)}}.$$

Thus, Equation 3 can be defined:

$$c(\gamma_{s(0)}) \approx \frac{1 - \gamma_{s(0)}}{1 + \gamma_{s(0)} - 2\gamma_{s(0)}^{D+1}}. \quad \text{Equation 3}$$

The input to the above FIR filter is the target sequence, which is a function of discrete time and jumps at the segments' boundaries. Mathematically, the input is represented as a sequence of step-wise constant functions with variable durations and heights:

$$T(k) = \sum_{i=1}^{P} [u(k - k_{s_i}^l) - u(k - k_{s_i}^r)] T_{s_i}, \quad \text{Equation 4}$$

where u(k) is the unit step function, $k_s^r$, s=$s_1, s_2, \ldots, s_P$ are the right boundary sequence of the segments in the utterance, and $k_s^l$, s=$s_1, s_2, \ldots, s_P$ are the left boundary sequence. In general, $k_{s_{i+1}}^l = k_{s_i}^r$ for $1 \leq i < P$. The difference of the two gives the duration sequence. $T_s$, s=$s_1, s_2, \ldots, s_P$ are the target vectors for segment s.

For description of the present invention, it is assumed that both left and right boundaries (and hence the durations) of all the segments in an utterance are known. For the training set, the boundaries are provided in TIMIT database. For the test set, where the current model is used to predict the VTR frequency trajectories, the boundaries in the target sequence input to the filter come from a recognizer's forced alignment results, on which the experimental results described herein are based.

FIG. 4 provides a graph of a target sequence 404 that can be described by Equation 4. In FIG. 4, time is shown on horizontal axis 400 and frequency is shown on vertical axis 402. In FIG. 4 there are four segments having four targets 406, 408, 410 and 412.

The boundaries for the segments must be known in order to generate the target sequence. This information can be determined using a recognizer's forced alignment results or can be learned automatically using algorithms such as those described in J. Ma and L. Deng, "Efficient Decoding Strategies for Conversational Speech Recognition Using a Constrained Non-Linear State Space Model for Vocal-Tract-Resonance Dynamics," IEEE Transactions on Speech and Audio Processing, Volume 11, 203, pages 590-602.

Given the filter's impulse response and the input (target sequence) to the filter, the filter's output as the model's prediction for the VTR trajectories is the convolution between these two signals. The result of the convolution within the boundaries of the home segment s is as shown in Equation 5, $$\hat{g}_s(k) = h_{s(k)} \otimes T(k) = \sum_{\tau} c(\gamma_{s(\tau)}) T_{s(\tau)} \gamma_{s(\tau)}^{|k-\tau|}, \quad \text{Equation 5}$$

where the input target vector and the filter's stiffness vector may take not only values associated with the current home segment, but also those associated with the adjacent segments since the time $\tau$ in Equation 5 can go beyond the home segment's boundaries. Equation 5 gives a value of the trajectory at a single value of k. In Equation 5, the stiffness parameter and the normalization constant C, are dependent on the segment at time $\tau$. Under one embodiment of the present invention, each segment is given the same stiffness parameter and normalization constant. Even under such an embodiment, however, each segment would have its own target value $T_{s(\tau)}$.

The individual values for the trajectory of the VTR can be sequentially concatenated together using Equation 6. A sequential concatenation of all outputs $\hat{g}_s(k)$, s=$s_1, s_2, \ldots, s_P$ constitutes the model prediction of VTR trajectories for the entire utterance:

$$\hat{g}(k) = \sum_{i=1}^{P} [u(k - k_{s_i}^l) - u(k - k_{s_i}^r)] \hat{g}_{s_i}(k) \quad \text{Equation 6}$$

Note that a separate computation of Equation 6 is performed for each VTR frequency resulting in separate VTR trajectories. The convolution operation above carried out by the filter in the model guarantees continuity of the trajectories at each junction of two adjacent segments, contrasting the discontinuous jump in the input to the filter at the same junction. This continuity is applied to all classes of speech sounds including consonantal closure. This provides the mechanism for coarticulation and VTR target undershooting in the current hidden trajectory model.

The parameters of the filter, as well as the duration of the targets for each phone, can be modified to produce many kinds of target undershooting effects in a contextually assimilated manner.

FIG. 4 shows a predicted VTR trajectory 414 developed under the model of the present invention using an FIR filter and target sequence 404 of FIG. 4. As shown in FIG. 4, the VTR trajectory is a continuous trajectory that moves toward the target of each segment. For longer length segments, the VTR trajectory comes closer to the target than for shorter segments.

FIG. 5 shows a graph of a target sequence and a resulting predicated VTR trajectory using the present model, in which the same segments of FIG. 4 are present, but have a much shorter duration. Thus, the same targets are in target sequence 504 as in target sequence 404, but each has a shorter duration. As with FIG. 4, in FIG. 5, time is shown along horizontal axis 500 and frequency is shown along vertical axis 502.

Because of the shorter duration of each segment, the predicted VTR trajectories do not come as close to the target values in FIG. 5 as they did in FIG. 4. Thus, as the duration of a speech segment shortens, there is an increase in the reduction of the VTR trajectories predicted by the present model. This agrees well with the observed reductions in VTR trajectories as speech segments shorten.

Figure 6:
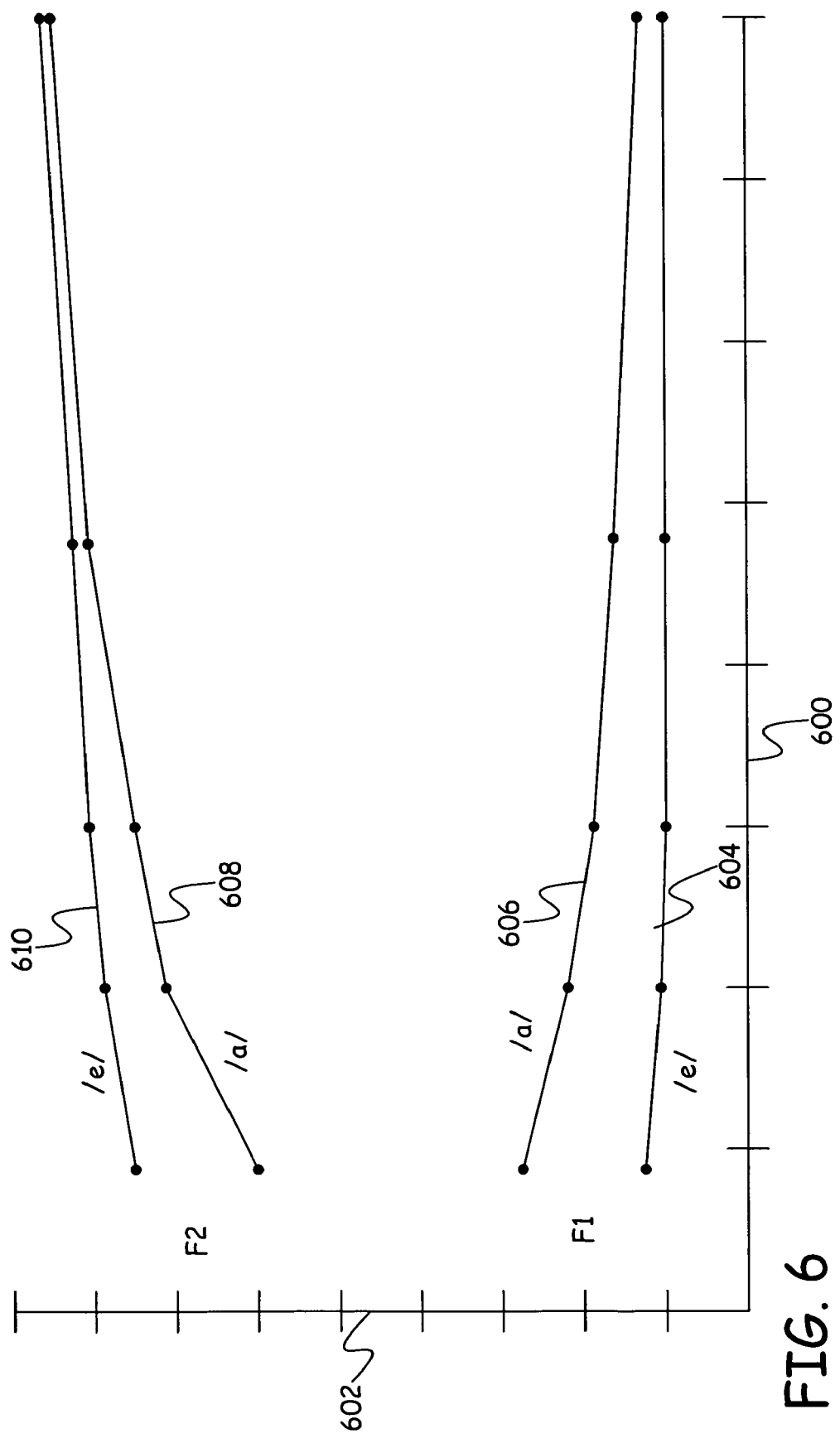
FIG. 6 provides a graph of predicted VTR values using the first VTR model of the present invention as speaking rate increases.

The predicted VTR trajectories under the present invention also predict the static confusion between phonemes that is found in the observation data of FIG. 3. In particular, as shown in FIG. 6, the FIR filter model of the present invention predicts that as speaking rates increase the values of the first and second VTRs for two different phonetic units will begin to approach each other. As in FIG. 3, in FIG. 6, speaking rate is shown along horizontal axis 600 and VTR frequency values are shown along vertical axis 602.

In FIG. 6, lines 604 and 610 show the values predicted by the model of the present invention for the first and second VTRs, respectively, of the phonetic unit /e/ as a function of speaking rate. Lines 606 and 608 show the values predicted by the model for the first and second VTRs, respectively, of the phonetic unit /a/.

As shown by FIG. 6, the predicted values for the first and second VTRs of phonetic units /e/ and /a/ converge towards each other as the speaking rate increases. Thus, the FIR filter model of the present invention generates VTR trajectories that agree well with the observed data and that suggest that static confusion between phonetic units is caused by convergence of the VTR values as speaking rates increase.

Figure 7:
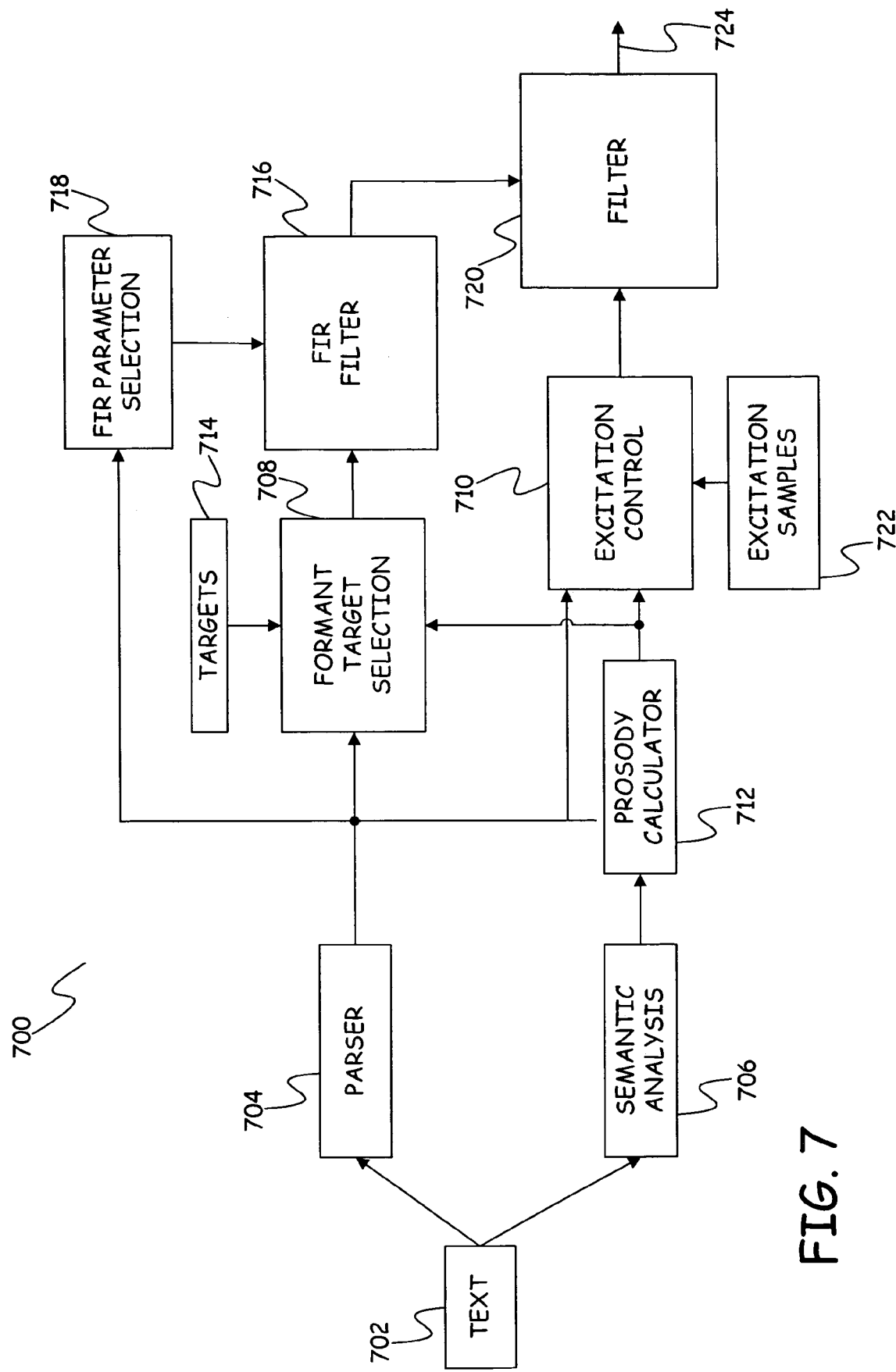
FIG. 7 is a block diagram of a speech synthesis system in which the present invention may be practiced.

The VTR trajectory model of the present invention may be used in a speech synthesis system such as speech synthesizer 700 of FIG. 7. In FIG. 7, a text 702 is provided to a parser 704 and a semantic analysis component 706. Parser 704 parses the text into phonetic units that are provided to a VTR target selection unit 708 and an excitation control 710. Semantic analysis component 706 identifies semantic features of text 702 and provides these features to a prosody calculator 712. Prosody calculator 712 identifies the duration, pitch, and loudness of different portions of text 702 based on the semantic identifiers provided by semantic analysis 706. Typically, the result of prosody calculator 712 is a set of prosody marks that are provided to excitation control 710 and VTR target selection 708.

Using the prosody marks, which indicate the duration of different sounds, and the identities of the phonetic units provided by parser 704, VTR target selection 708 generates a target sequence using a set of predefined targets 714. Typically, there is a separate set of targets 714 for each phonetic unit that can be produced by parser 704, where each set targets includes a separate target for each of four VTRs.

The output of VTR target selection 708 is a sequence of targets similar to target sequence 404 of FIG. 4, which is provided to a finite impulse response filter 716. The impulse response of finite impulse response filter 716 is defined according to Equation 1 above. Under some embodiments, the response is dependent on the particular phonetic units identified by parser 704. In such cases, the response of the filter is set by an FIR parameter selection unit 718, which selects the parameters from a set of stored finite impulse response parameters based on the phonetic units identified by parser 704.

The output of FIR filter 716 is a set of VTR trajectories, which in one embodiment includes trajectories for four separate VTRs. These VTR trajectories are provided to filter 720. FIR filter 716 thus provides the implementation of Stage I of the HTM described above. The filter 720 provides three functions: 1) the implementation of Stage II of the HTM which transforms the VTR (resonance frequencies and bandwidths) trajectories into trajectories of linear cepstral vectors; 2) transformation of the trajectories of linear cepstral vectors into trajectories of linear spectral vectors; and 3) generation of speech waves by combining the trajectories of linear spectral vectors with the excitation signal from 710.

Excitation control 710 uses the phonetic units from parser 704 and the prosody marks from prosody calculator 712 to generate an excitation signal, which, in one embodiment, is formed by concatenating excitation samples from a set of excitation samples 722. The excitation signal produced by excitation control 710 is passed through a multi-function filter 720, which, at the final stage, filters the excitation signal based on the VTR trajectories identified by FIR filter 716. The VTR trajectories provided as the output of Stage I of the HTM are input to Stage II of the HTM, which is the first of the three functions served by filter 720, converting VTR trajectories into cepstral trajectories. The cepstral trajectories are used to provide synthesized speech waveforms 724 after being converted to spectral trajectories and after combining with excitation samples.

As noted earlier, the model for VTRs, described by Equations 4 through 6, relatively accurately predicts the static confusion represented by the data of FIG. 3, for example, and therefore is useful in speech synthesis systems, such as the system shown in FIG. 7. However, the above model for VTRs (hereinafter referred to as the first model) does not take into account randomness (or variability) in the VTR targets. Thus, when used in speech recognition systems, for example, it is best suited to help recognize speech from a fixed speaker.

Stage II of the hidden trajectory model is responsible for converting the VTR vector $\hat{g}(k)$ at each time frame k into a corresponding vector of Linear Predictive Coding (LPC) cepstra o(k). The mapping, as has been implemented, is in a memoryless fashion (i.e., no temporal smoothing), and is statistical rather than deterministic. To describe this mapping function, the VTR vector g is decomposed into a set of K resonant frequencies f and bandwidth b. That is, let $$g = \begin{pmatrix} f \\ b \end{pmatrix},$$

where $$f = \begin{pmatrix} f_1 \\ f_2 \\ \vdots \\ f_K \end{pmatrix} \text{ and } b = \begin{pmatrix} b_1 \\ b_2 \\ \vdots \\ b_K \end{pmatrix}.$$

Then the statistical mapping from VTRs to cepstra is represented by Equation 7, $$o(k) = \Psi(\hat{g}_s(k)) + \mu_s + v_s(k), \qquad \text{Equation 7}$$

where $v_s$ is a segment-dependent, zero-mean Gaussian random vector following the Gaussian distribution of $N(v; 0, \Sigma_s)$, and $\mu_s$ is a subsegment-dependent bias vector for the nonlinear predictive function $\Psi(g_s)$.

In Equation 7, the output of the mapping function $\Psi(\hat{g})$ has the following parameter-free, analytical form for its n-th vector component (i.e., n-th order cepstrum) as shown in Equation 8, $$o_n = \frac{2}{n} \sum_{k=1}^{K} e^{-\pi n \frac{b_k}{f_{samp}}} \cos\left(2\pi n \frac{f_k}{f_{samp}}\right) \qquad \text{Equation 8}$$

where the speech signal sampling frequency $f_{samp} = 16000$ Hz is used for the TIMIT data in our experiments.

III. Speaker-Independent Learning of VTR Target Parameters

In this section, a description is provided of speaker-independent training of the VTR target vectors $T_s$, which is a function of the phone segment s but is context independent. Given the results of VTR tracking $\bar{z}(k)$, the training is aimed to maximize the likelihood of such tracked VTR "data". Assuming the tracked VTR data obey a Gaussian distribution, where the mean vector is the VTR trajectory $\hat{g}(k)$ generated from Stage I of the hidden trajectory model, and the covariance matrix is denoted by $Q_s$. (Note that $\hat{g}(k)$ contains the VTR target parameters $T_s$, which are to be optimized.) Then the objective function for the training becomes $$\log P = -0.5 Q_s^{-1} \sum_{k=1}^{K} [\bar{z}(k) - \hat{g}_s(k)]^2,$$

whose gradient is:

$$\frac{\partial \log P}{\partial T_s} = Q_s^{-1} \sum_{k=1}^{K} [\bar{z}(k) - \hat{g}_s(k)] \frac{\partial \hat{g}_s(k)}{\partial T_s}. \qquad \text{Equation 9}$$

Using Equation 5, the gradient on the right hand side of Equation 9 is computed as:

$$\frac{\partial \hat{g}_s(k)}{\partial T_s} = \sum_{\tau=\max(k-D, bd_l)}^{\min(k+D, bd_r)} c_{\gamma_s} \gamma_s^{|k-\tau|} \qquad \text{Equation 10}$$

where $bd_l$ and $bd_r$ are the left and right boundaries for the current phone segment s. Note that this gradient is not a function of the target parameters $T_s$ for the optimization; i.e., it is a constant with respect to $T_s$. Choosing this constant to be the inverse of the total frames of all tokens of segment s in the training data, the result is the following gradient descent estimate for $T_s$:

$$\hat{T}_s^{n+1} = \hat{T}_s^n + \alpha \frac{\sum_{tok}\sum_{k=1}^{K_s^{tok}}\{\bar{z}^{tok}(k) - \hat{g}_s^{tok}(k|\hat{T}_s^n)\}}{\sum_{tok} K_s^{tok}}, \quad \text{Equation 11}$$

where the trajectory function $\hat{g}_s^{tok}(k)$ is determined by the FIR filter's output, and $K_s^{tok}$ is the duration of token tok of segment s. Superscript n denotes the iteration number. In an example embodiment of the present invention, the learning rate α in Equation 11 is set to be one.

Note that in Equation 11, the "data" $\bar{z}^{tok}(k)$ is computed from an existing VTR tracker, and $\hat{g}_s^{tok}(k|\hat{T}_s^n)$ is computed using the target $\hat{T}_s^n$ from the previous iteration n. Initialization of the target parameters $\hat{T}_s^0$ is based on modified target values of a Klatt synthesizer. An example of a Klatt synthesizer can be found in the publication by D. Klatt entitled "Software for a cascade/parallel formant synthesizer," J. Acoust. Soc. Am., Vol. 99, No. 3, 1980, pp. 971-995. Note that the estimate of $\hat{T}_s$, upon convergence of the iterations, is assumed to be the same for all speakers.

IV. Speaker-Adaptive Learning of VTR Target Parameters

A. Introduction

In previous sections, a hidden trajectory model has been presented where the unobserved VTR trajectory is predicted (in model Stage I) with only the sequence of phones and their boundaries by filtering the VTR targets using the bi-directional FIR filters. It was assumed that the targets are the same for all the speakers. However, due to the difference in the vocal tract length as well as in the geometry for different speakers, the VTR targets for different speakers would differ. To incorporate these speaker-specific target parameters in the hidden trajectory model, the present invention includes an iterative speaker-adaptive training technique to estimate the generic and adapted speaker's VTR target parameters $\hat{T}_s^{generic}$. During the training, the difference in each speaker's VTR targets is taken into account by scaling the generic VTR targets $\hat{T}_s^{generic}$ (computed from the immediately previous iteration):

$$\hat{T}_{s,spk} = \beta^{spk} \cdot \hat{T}_s^{generic}, \quad \text{Equation 12}$$

where $\beta^{spk}$ is the speaker-dependent normalization or scaling factor inversely proportional to the vocal tract length of speaker spk. In one current implementation, $\beta^{spk}$ is a vector, with each component for each corresponding VTR component. The same scaling is applied to each of separate test speakers in the recognition task to be described in Section V. This strategy of adapting the target parameters to individual speakers is motivated by the popular technique of vocal tract length normalization for the acoustic data.

Figure 8:
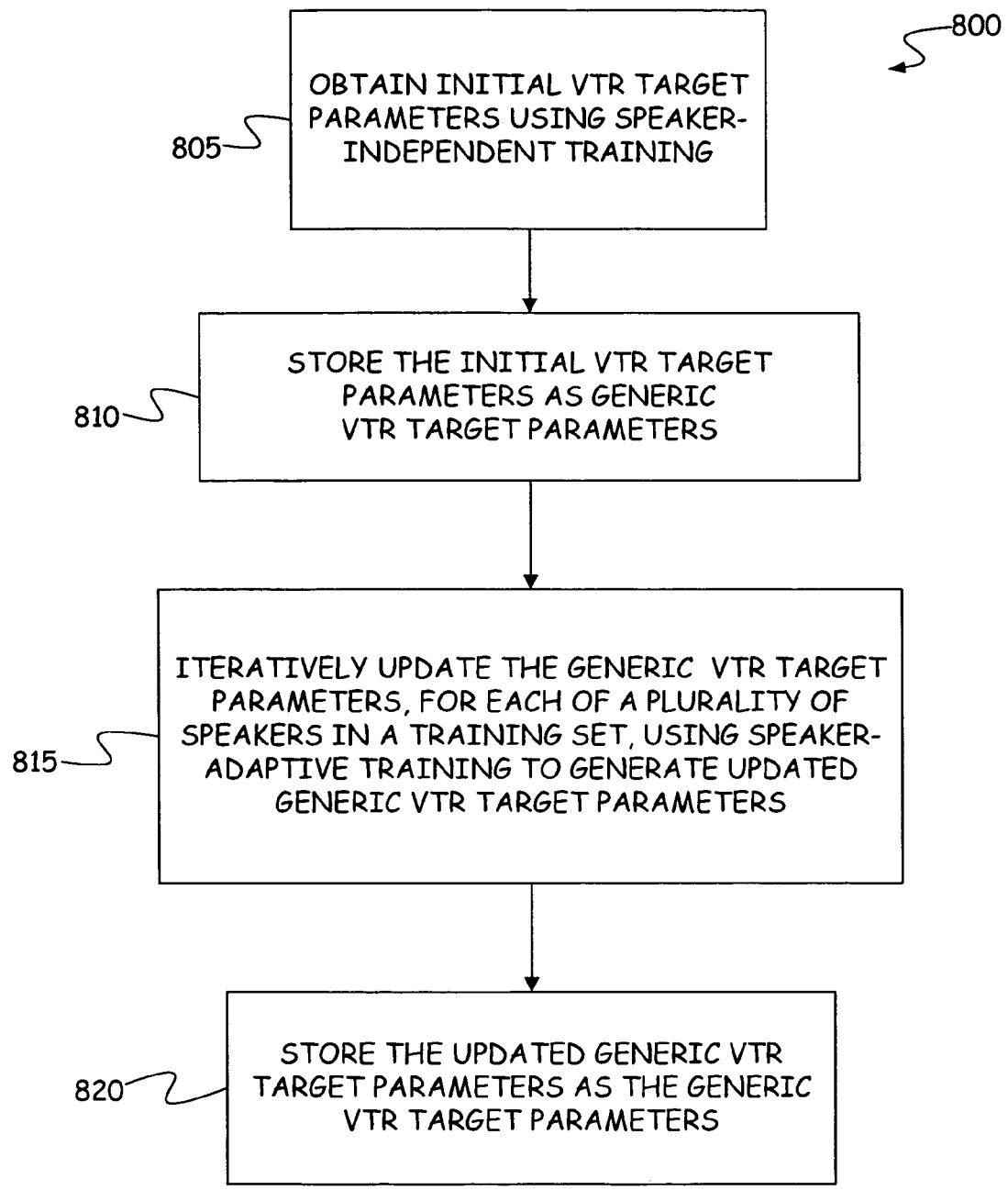
FIG. 8 is a flow diagram illustrating a method in accordance with the present invention.
Figure 9:
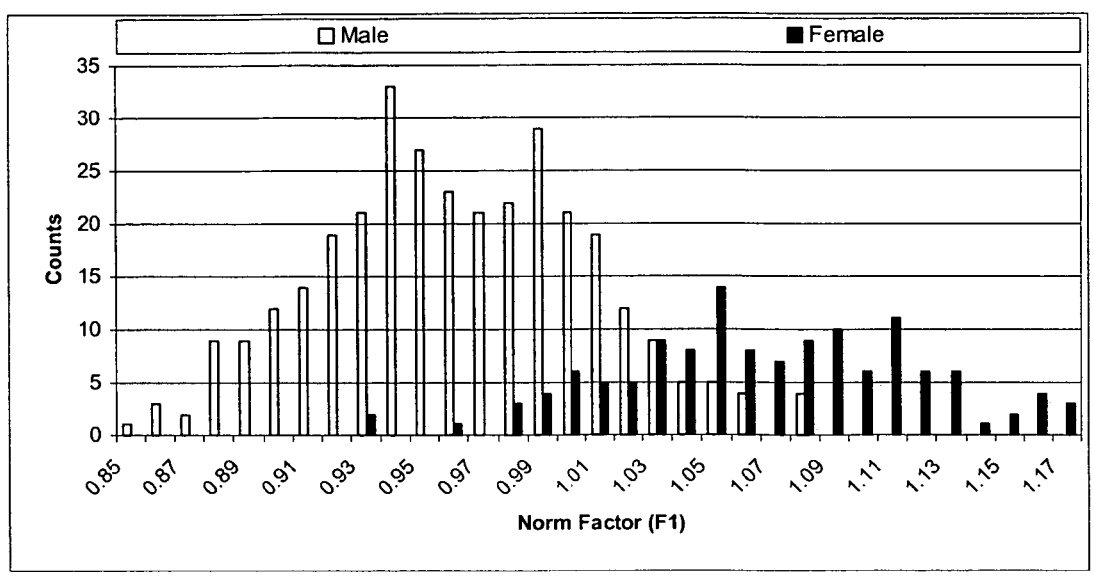
FIGS. 9-12 are diagrammatic illustrations of histograms of the estimate of the normalization or scaling factor for the F1-F4 components, respectively.
Figure 10:
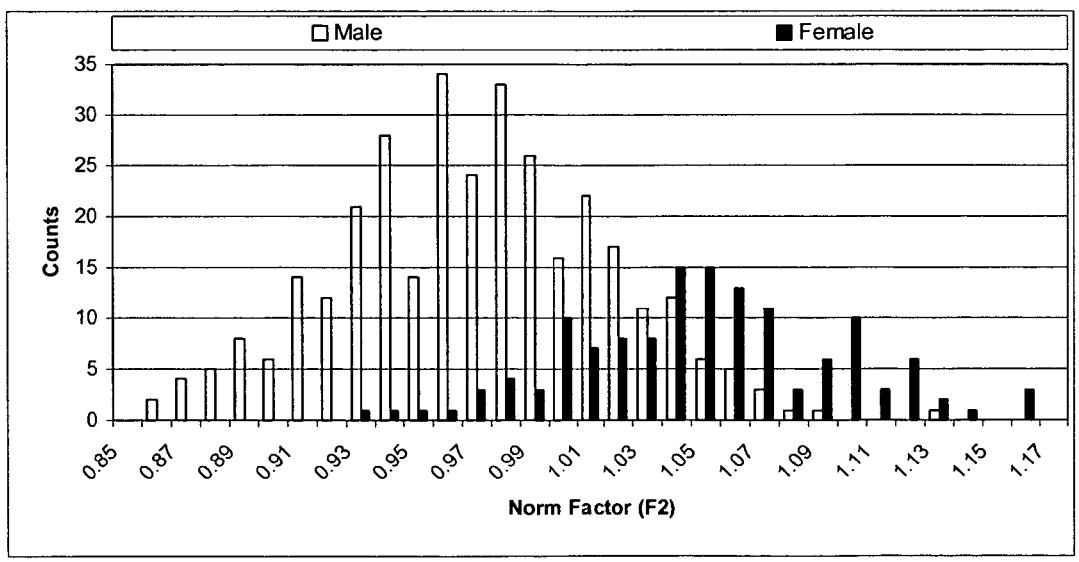
Figure 11:
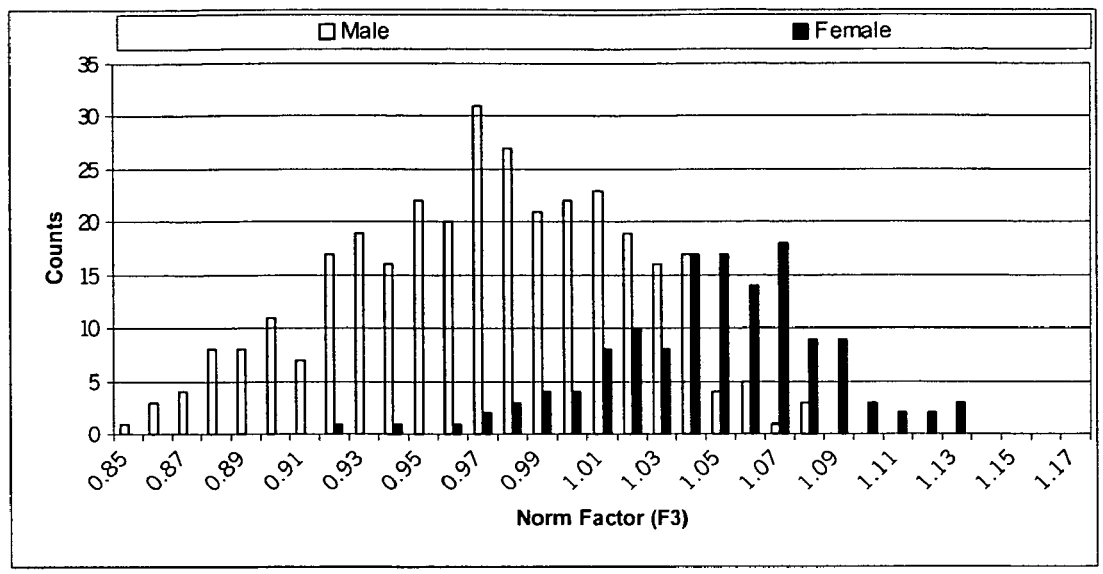
Figure 12:
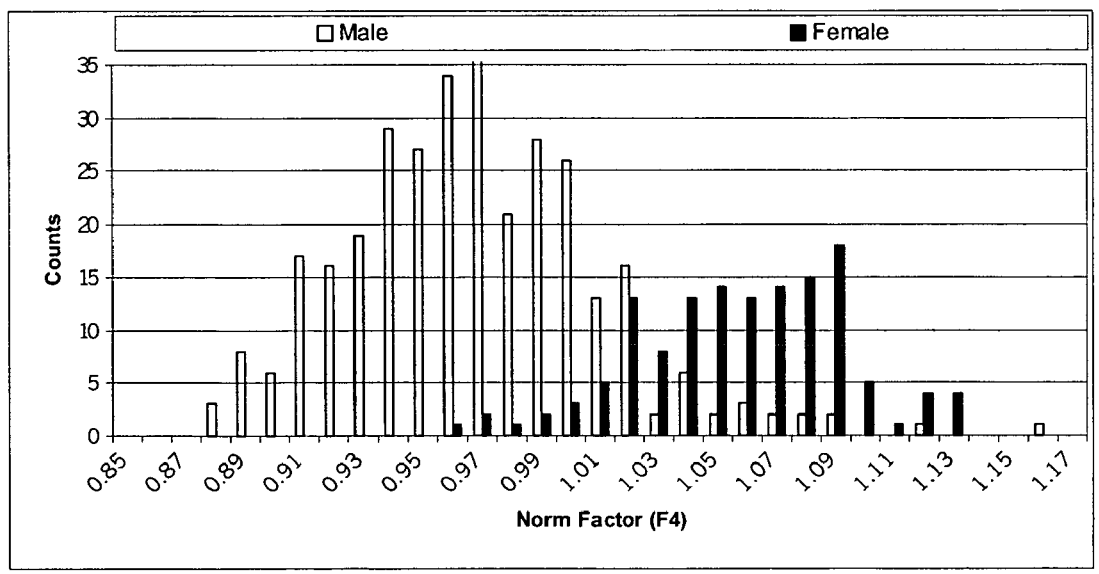

FIG. 8 is a flow diagram 800 illustrating a method of training a hidden trajectory model, of a speech recognition system, which generates Vocal Tract Resonance (VTR) targets. As shown at step 805, the method includes obtaining initial VTR target parameters using speaker-independent training as described above. Next, at step 810, the method includes storing the initial VTR target parameters as generic VTR target parameters $\hat{T}_s^{generic}$. This is targets 714 in FIG. 7. Next, at step 815, the method is shown to include iteratively updating the generic VTR target parameters, for each of a plurality of speakers in a training set, using speaker-adaptive training to generate updated generic VTR target parameters. The iterative updating is done using speaker-dependent scaling factor $\beta^{spk}$ as will be described further below. Then, at step 820, the method is shown to include storing the updated generic VTR target parameters, for use by a target selector to generate VTR sequences, as the generic VTR target parameters $\hat{T}_s^{generic}$ in order to configure the hidden trajectory model to perform speech recognition. Embodiments for these steps are described in detail in the following sections.

In some embodiments, the speaker-dependent VTR target sequences are generated as a function of the generic VTR target parameters $\hat{T}_s^{generic}$ and of the calculated speaker-dependent scaling factor $\beta^{spk}$ corresponding to the particular user. Then, HDM model scores are calculated using the generated speaker-dependent VTR target sequences.

B. Computation of the Scaling Factor

A description is now provided of how the scaling factor $\beta^{spk}$ is computed in adaptive training algorithms of the present invention. VTR tracking, is used, and the same assumption is followed as was for vocal tract length normalization that the ratio of average formant values of two speakers is a good estimate of the two speakers' vocal tract lengths. Thus, the scaling factor can be simply computed by:

$$\beta^{spk} = \frac{E(\bar{z}^{spk})}{E(\bar{z}^{train})}, \quad \text{Equation 13}$$

where $E(\bar{z}^{spk})$ is the averaged VTR frequencies over all frames in the utterance from a specific speaker spk (the specific speaker either in the training or in the test data), and $E(\bar{z}^{train})$ is the averaged VTR frequencies over all frames in the full training set corresponding to the generic speaker. During experiments, it has been found that the estimates of VTR frequencies of many consonants are less reliable than those of vowels. Therefore, VTR frequency estimates are limited to only those frames corresponding to the vowels in computing the normalization vector:

$$\beta^{spk} = \frac{E(\bar{z}_v^{spk})}{E(\bar{z}_v^{train})}. \quad \text{Equation 14}$$

where for the training data of TIMIT (as in experiments relating to the present invention), the vowel regions are labeled in the database, and for the test data, the vowel regions are hypothesized for each item in the N-best list.

In experiments, it was discovered further that the wide range of vowel VTR or formant values creates undesirable biases in the estimate of the scaling factor in Equation 14. To illustrate this problem, the average VTR frequency for an utterance that contains vowel tokens of only /aa/ will be significantly different than that with vowel tokens of only /iy/, even though both utterances are generated by the same speaker. This causes the estimates of the scaling factor to be vastly different, even if they should ideally be the same for the same speaker. To solve this problem, the estimate of the scaling factor in Equation 14 is further refined to the one using normalized vowel VTR frequencies $E_n(\bar{z}_v)$ averaged over all tokens as shown in Equation 15.

$$\beta^{spk} = \frac{E_n(\bar{z}_v^{spk})}{E_n(\bar{z}_v^{train})}.$$

Equation 15

The numerator and denominator in Equation 15 are the normalized average VTR frequencies for individual speaker (denoted by spk) and for all speakers in the training set (denoted by train), respectively. They are computed using the relationship illustrated in Equation 16, $$E_n(\bar{z}_v) = \frac{\sum_{i=1}^{V} N_{v_i} \frac{E(\bar{z}_{v_i})}{E(\bar{z}_{v_i}^{train})}}{\sum_{i=1}^{V} N_{v_i}},$$

Equation 16 where V is the number of different vowels in all utterances in the training set, and $N_{v_i}$ is the number of frames of vowel $v_i$. That is, the averages are carried out over all frames of all vowels in the training set. The division in Equation 16 by $E_n(\bar{z}_v^{train})$ accomplishes the normalization. After the normalization, the utterances from the same speaker that contain different vowels (such as only /aa/ and only /iy/ in separate utterances) will produce approximately the same $E_n(\bar{z}_v^{spk})$ and hence the same scaling factor $\beta^{spk}$. Note that using the relationship defined in Equation 16, $E_n(\bar{z}_v^{train})=1$. Therefore, Equation 15 is simplified to Equation 17:

$$\beta^{spk} = E_n(\bar{z}_v^{spk}) = \frac{\sum_{i=1}^{V} N_{v_i} \frac{E(\bar{z}_{v_i})}{E(\bar{z}_{v_i}^{train})}}{\sum_{i=1}^{V} N_{v_i}}.$$

Equation 17

C. Algorithm Summary and Discussion

With Equation 17, the scaling factor for each individual speaker in either training data or in test data are determined. For the test utterance, the use of Equation 12 (after $\hat{T}_s^{generic}$ is obtained as outlined in the next paragraph) effectively adapts the target parameters in the hidden trajectory model to that test speaker. These adapted target parameters are used for recognition.

The generic VTR targets $\hat{T}_s^{generic}$ are learned from the training data in an iterative, speaker-adaptive manner. Initial VTR target vectors, $\hat{T}_s^{generic}(0)$, are provided by the speaker-independent training as described in the preceding section. Then, for each successive iteration, the scaling factor for each speaker in the training set is computed by Equation 17. This then gives the speaker-adapted VTR target parameters according to Equation 12. These adapted target parameters are then used to predict the speaker-specific VTR trajectory using Stage I of the hidden trajectory model, giving rise to the quantity of:

$$\hat{g}_{s,spk}(k | \beta^{spk} \cdot \hat{T}_s^{generic}(n)).$$

This is then compared with the tracked VTR "data" and the difference is averaged over all frames, all tokens, and all speakers. The final iterative training formula is as illustrated in Equation 18, $$\hat{T}_s^{generic}(n+1) = \hat{T}_s^{generic}(n) + \frac{\sum_{spk} \sum_{tok} \sum_{k=1}^{K_{s,spk}^{tok}} \{\bar{z}_{s,spk}^{tok}(k) - \{\hat{g}_{s,spk}^{tok}(k | \beta^{spk} \cdot \hat{T}_s^{generic}(n))\}\}}{\sum_{spk} \sum_{tok} K_{s,spk}^{tok}}$$

Equation 18 which can be shown to be a maximum likelihood estimate in a similar way to the derivation of the speaker-independent training of Equation 11.

In Equation 18, the second term is the adjustment of the VTR targets by the amount that is equal to the per-frame difference between model-predicted VTR trajectory and the tracked VTR "data". The amount of adjustment diminishes as the model-predicted trajectory closely matches the data. It has been found in experiments that the likelihood for the tracked VTR "data" is always monotonically increasing over the iterations of the training according to Equation 18. In practice, four iterations of the algorithm of Equation 18 were used for the 462 speakers in TIMIT training data. Beyond four iterations, the increase of the likelihood becomes much less than the earlier iterations.

V. Experiments and Results

In this section, the results of analysis and phone recognition experiments using the TIMIT database are presented. These results provide evidence for the effectiveness of the speaker-adaptive learning technique just described. In particular, the hidden trajectory models are compared with the VTR target parameters trained using speaker-independent and speaker-adaptive algorithms, as detailed in Sections III and IV, respectively. First, the distributional results of the scaling factors for all the 462 speakers in TIMIT's training set are shown. Then, a typical speech utterance is used to demonstrate that with the adaptively learned target parameters, both the VTR trajectory prediction (as the output of model Stage-I) and the cepstral trajectory prediction (as the output of model Stage-II) match real speech data much better than using speaker-independent training. Finally, the phonetic recognition results with N-best rescoring are shown, further demonstrating the superiority of the speaker-adaptive learning.

A. Distributed Results on the Estimate of the Scaling Factor

The distributional results on the estimate of the scaling factor vector, $\beta_{spk}$, are shown component by component (F1 to F4), using the estimation formula of Equation 17. The results are obtained from a total of 462 speakers in the TIMIT training set. These distributional results are plotted in FIGS. 9-12, respectively, for the four components (F1, F2, F3 and F4) of $\beta_{spk}$ in terms of histograms. The results are plotted separately for the male and female populations of the data.

According to Equation 12, the scaling factor measures the ratio of the VTR targets of the specific speaker to the "generic" speaker. This ratio is approximately the ratio of the two speakers' vocal tract lengths. Since the generic speaker's targets are computed from the full pool of speakers including both males and females (according to Equation 18), its VTR target values are in between those of a typical female and a typical male speaker. The distributional results, shown consistently in FIGS. 9-12, illustrate that the estimates of the scaling factors for most of the female speakers are greater than one and those for most of the male speakers are lower than one. These are qualitatively consistent with the estimates of the relative vocal tract lengths using a completely different technique on the same TIMIT database. This consistency suggests that the estimation technique presented in Section IV is effective.

The results shown in FIGS. 9-12 illustrate that different speakers in the TIMIT database could have their VTR targets differ as much as 40% (ratio of two extreme values in the estimate of the normalization factor, 1.17/0.86). Male speakers tend to have higher scaling factors (or longer vocal tract lengths) while female speakers tend to have lower scaling factors (or shorter vocal tract lengths). If such significant differences are not taken into account, as in speaker-independent training, the VTR trajectory prediction based on the VTR targets (as inputs to the FIR filter) would be less accurate for those speakers that have the scaling factors substantially different from one. Inaccurate VTR trajectory prediction will lead to inaccurate cepstral sequence prediction, leading to greater error rates by the hidden trajectory model used as a speech recognizer. Direct evidence for these points is provided in the remainder of this section.

B. Results on Prediction of VTR Trajectories and Cepstral Sequences

A demonstration is now provided of the effects of speaker-adaptive learning on the prediction accuracies of the VTR frequency trajectories (as the output of the hidden trajectory model stage I) and of the cepstral sequences (as the output of the hidden trajectory model stage II). In doing the predictions, the phone identities and their boundaries provided in the TIMIT database are used as the input to model stage-I. Since the hidden trajectory model assumes constant targets for each phone, all compound phones (affricates and diphthongs) are first decomposed into their constituent sounds.

The model prediction incorporating VTR target adaptation proceeds as follows. The VTR targets for the generic speaker are trained using all training data according to Equation 18, and for each individual speaker, Equation 17 is applied to obtain the estimate of the scaling factor. The new adapted set of VTR targets for this speaker are then computed as the scaled version of the generic speaker's targets according to Equation 12. These targets values are then fed into the model stage-I for the VTR trajectory prediction, and the output of the predicted VTR trajectory is fed to model stage II for the cepstral sequence prediction.

Figure 13:
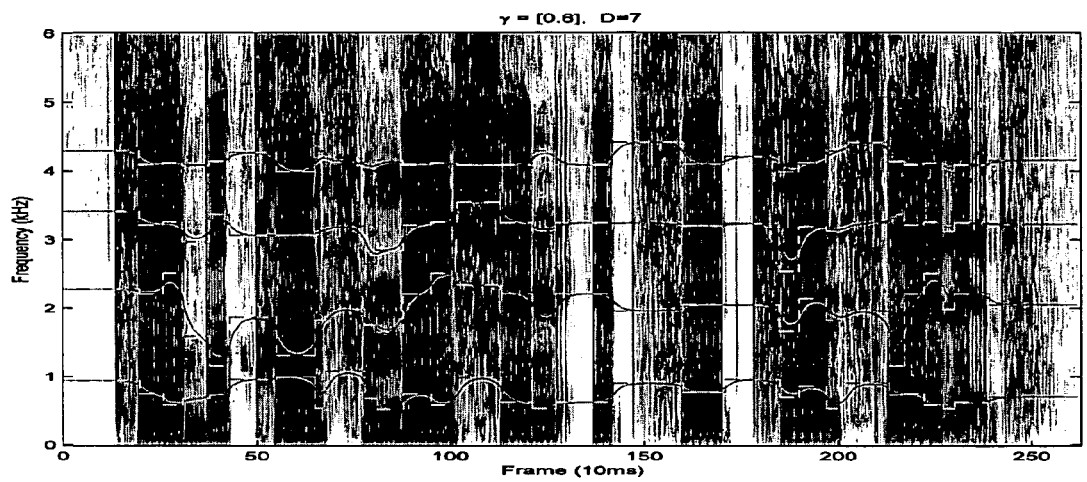
FIGS. 13 and 14 are diagrammatic illustrations of VTR trajectory predictions.

FIG. 13 shows the VTR prediction results for a female speaker, using the VTR targets obtained from the above speaker-adaptive learning. (Utterance SI487 by Speaker FKSR0 in dialect region 7: "Cable confirmation, it said translated".) The VTR trajectory prediction uses the bi-directional FIR filter and the VTR targets estimated with speaker-adaptive learning. The step-wise dashed lines are the target sequences (F1-F4) as inputs to the FIR filter, and the continuous lines are the outputs (F1-F4) of the filter as the predicted VTR frequency trajectories. The prediction results, shown as the four smooth lines (from F1 to F4), are superimposed on the spectrogram which shows true VTR trajectories (for the vocalic regions) as the spectral prominences or dark bands. These lines are the outputs of the FIR filter in model stage I, and to illustrate the filter operation, the input to the filter is also plotted as the step-wise dashed lines representing the corresponding four VTR target sequences. For the majority of the frames, the filter's output either coincides or is close to the true VTR frequencies.

Figure 14:
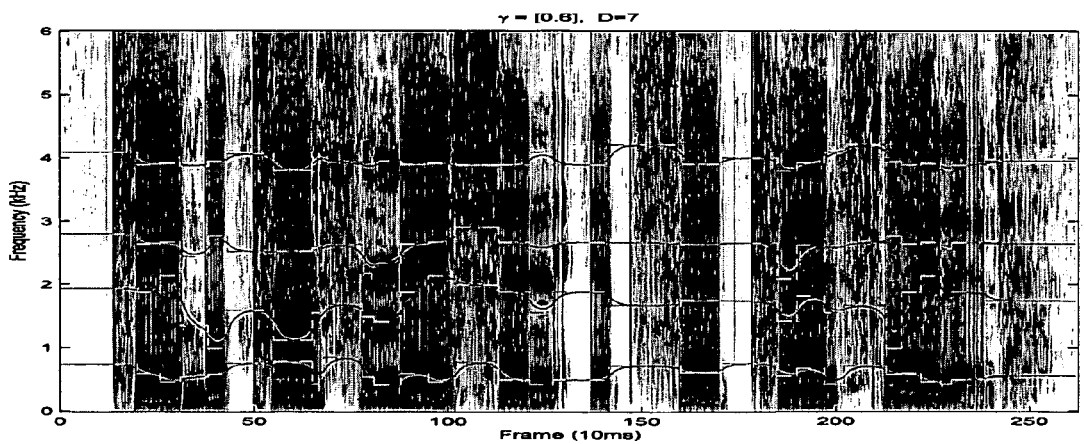

As a contrast, in FIG. 14, the same kind of VTR prediction results are shown for the same speaker and utterance, but using the VTR targets obtained from speaker-independent training. The predicted VTR frequency values are now almost always lower than the true values as identified from the vocalic regions of the spectrogram. This comparison demonstrates the effectiveness of the target adaptation.

Figure 15:
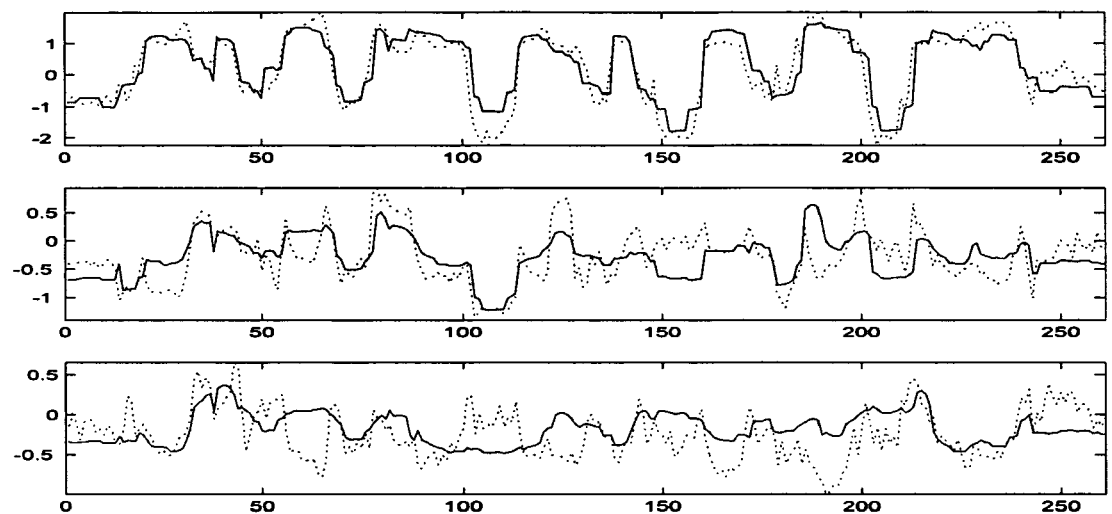
FIGS. 15 and 16 are diagrammatic illustrations of cepstral sequence predictions.
Figure 16:
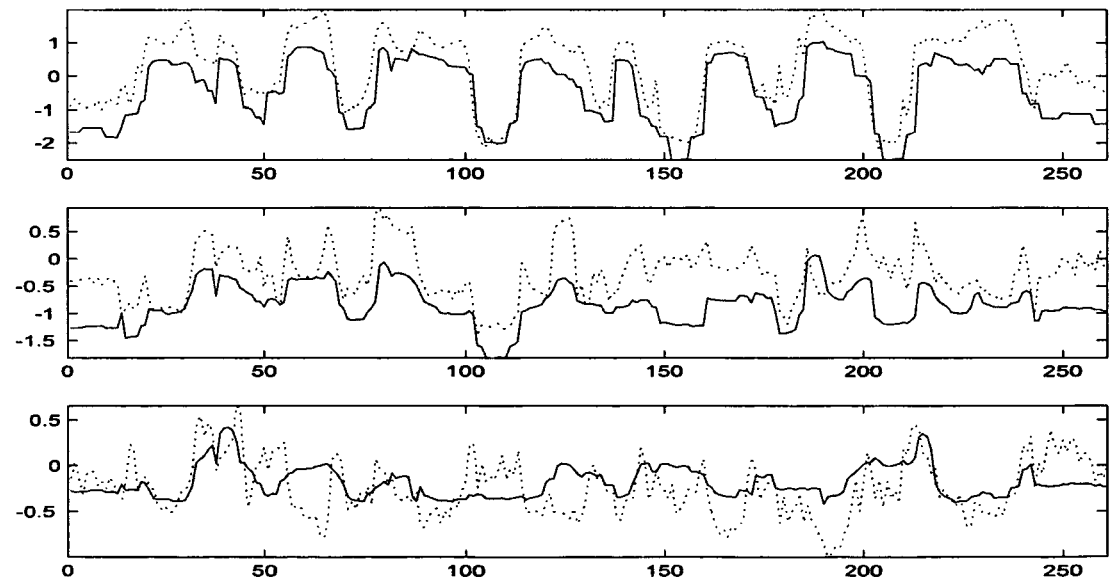

Further evidence for the effectiveness of speaker-adaptive target estimation is provided from the comparative results of cepstral sequence predictions as the output of model stage II; i.e., using the nonlinear mapping from VTRs to cepstra in Equation 8 on a frame-by-frame basis. FIGS. 15 and 16 show such prediction (solid lines for C1, C2, and C3) with and without the speaker-adaptive learning, respectively. The inputs to the mapping function are the predicted VTR trajectories (by model stage I) in FIGS. 13 and 14, respectively. The dotted lines in FIGS. 15 and 16 are the LPC cepstral data C1-C3 calculated from the acoustic signal waveform directly. It is clear that the predicted cepstra in FIG. 15 with target adaptation fit the data more closely than those in FIG. 16. Since the model-to-data match at the acoustic level, calculated as the likelihood of the model evaluated on the observed acoustic data, is the criterion by which the speech recognition decision is made, the above comparative results on cepstral fitting between the speaker-adaptive and speaker-independent training suggest that better recognition performance can be achieved by the former than the latter. This is confirmed by the phonetic recognition experiment presented next.

B. Results Phonetic Recognition

The experimental results of phonetic recognition on TIMIT with the standard core test set (192 utterances) are presented in this section to compare the relative effectiveness of the speaker-adaptive and speaker-independent training. Due to the high computational cost of direct decoding using the long-span, wide-context hidden trajectory model, the experiments are limited to the N-best rescoring paradigm. For each of the N-best lists consisting of the hypothesized phone sequence and the constituent phone boundaries, the VTR trajectory $\hat{g}(k)$ is generated using the targets learned in the training or adaptation phase disclosed earlier. Then, the likelihood of the acoustics in terms of cepstral sequence corresponding to the hypothesized phone sequence and to the generated VTR trajectory is computed using Equation 7.

A large-scale N-best list is used in the rescoring experiments in order to obtain meaningful results. In the experiments, the N-best list with N=1000 is used, which is generated by a conventional, high-quality tri-phone HMM with phone bigram as the "language model". It was found that even with the size of N to be as large as 1000, the oracle error rate is still over 18%, and increasing N to 2000 only reduces the oracle error rate to 17%, while substantially increasing the computational cost of the N-best rescoring experiments. Such a high oracle error rate is not favorable to the long-span contextual hidden trajectory model, since any local error in the hypothesized phone(s) tends to propagate to its neighbors due to the continuity constraint across phones on the VTR trajectory represented in model Stage-I. (This kind of "error propagation" effect is minimal for the short-span contextual models such as HMMs.) One simple way to artificially remove the error propagation effect is to manually add the reference hypothesis into the N-best list to form a new N+1=1001 candidate list. A good model should be able to rank the reference hypothesis higher to the top among all the 1001 hypotheses than a poor model, reducing the "sentence" error rate (SER). This SER can serve a meaningful performance measure for the quality of a long-span wide-context model such as our hidden trajectory model.

Figure 17:
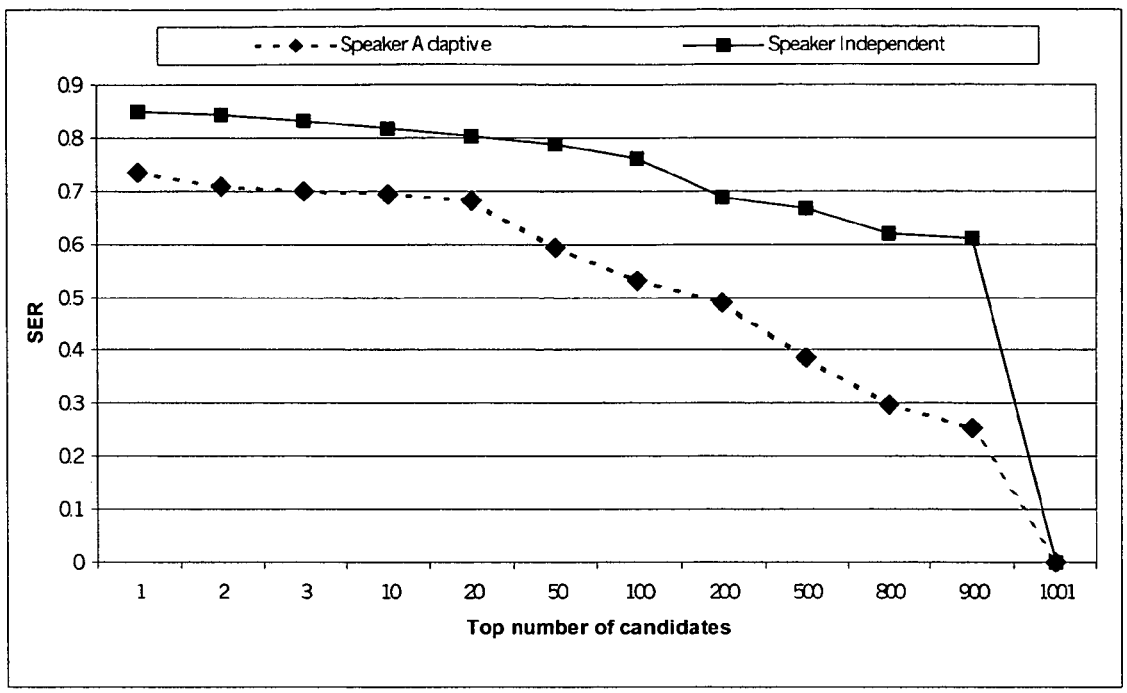
FIGS. 17 and 18 are plots illustrating sentence error rate (SER).

This SER is used as the performance measure on the TIMIT core test set to compare the hidden trajectory model whose VTR targets are adapted to each speaker versus the same model but with the VTR targets trained speaker independently. The results are shown in FIG. 17, where the oracle SER is plotted as a function of top number of choices in the overall 1001 hypotheses. FIG. 9A illustrates the oracle SER on the TIMIT core test set (192 utterances) using the bi-directional target-filtering hidden trajectory model with its VTR targets determined in two ways: speaker adaptive learning vs. speaker independent learning. The result is from rescoring of 1000-best lists generated from a conventional triphone HMM, and with the correct hypothesis added. No language model is used in rescoring. The reference is always within the total 1001 candidates, no matter how they are re-scored. Hence, when the top number of candidates is increased to 1001, the (oracle) SER naturally becomes zero. However, when the top number of candidates varies below 1001, the hidden trajectory model with speaker adapted VTR targets is shown to consistently outperform the counterpart with no such adaptation. For example, within the top 50 candidates (among 1001 in total) after rescoring by the model with speaker adaptive learning, 40% of the utterances (among 192 in total) have the respective references included, whereas with the rescoring done by the model with speaker independent targets, the inclusion rate drops to 21% (i.e., 79% SER).

Figure 18:
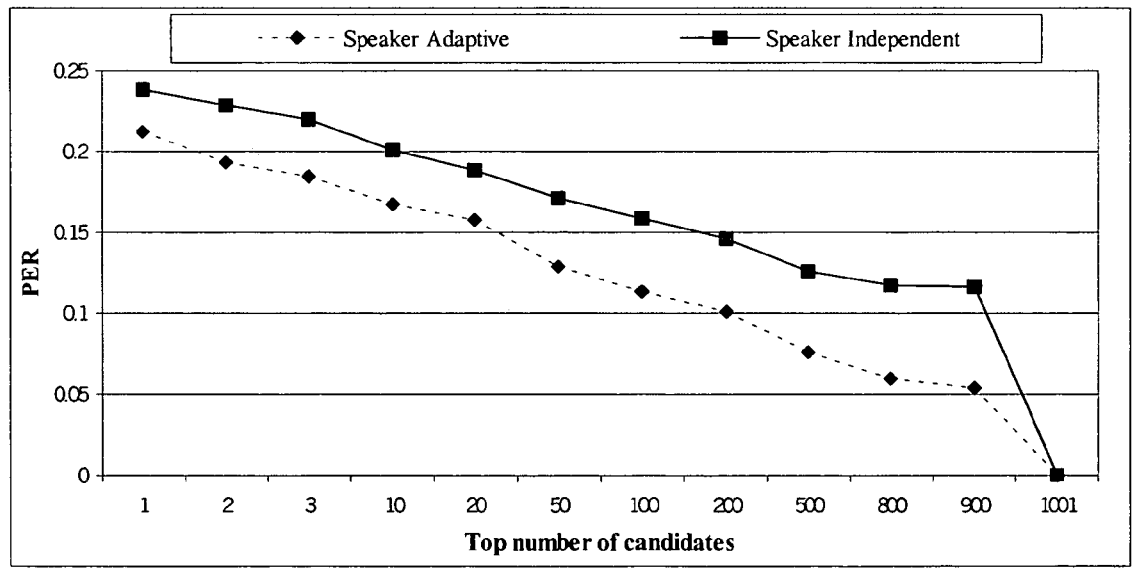

Similar results are obtained when the oracle phone error rate (PER), instead of oracle SER, is plotted in FIG. 18 for the two ways of determining the VTR targets. Again, consistently over all top numbers of candidates, the oracle PER is significantly lower for the speaker-adaptive model than for the speaker-independent model. Take the same data point at the top 50 candidates after rescoring by the model with speaker adaptive learning. Now the 40% of the reference inclusion rate (60% SER) gives 13% oracle PER. This is significantly lower than the 17% PER obtained by the model with the VTR targets trained speaker independently. For the top one candidate, the PER is dropped from 24% and 21% by speaker adaptive learning of targets, giving a 14% relative phone error reduction.

VI. Summary and Conclusions

The present invention includes a quantitative, two-stage model for predicting the VTR trajectories and then the subsequent cepstrum trajectories. This hidden trajectory model is based on a bi-directional filtering of phone-dependent, VTR target sequences implemented with a temporally symmetric FIR digital filter. The output of the filter is mapped to the LPC cepstrum via a parameter-free, analytical nonlinear prediction function. Given the LPC cepstral data computed from the input speech waveform, the likelihood that such acoustic data are generated from the model can be computed as the basis for speech recognition.

One important set of parameters in the hidden trajectory model is the VTR targets, which drive the entire generative process of the VTR and acoustic trajectories. An important inventive concept is the development of learning algorithms to automatically determine these target values from the observation data. Two algorithms are described. First, speaker-independent training is disclosed in Section III, which is based on the simplifying assumption that a single set of VTR targets are associated with all the speakers. Second, speaker-adaptive learning is disclosed in Section IV, resulting in a speaker specific set of VTR target parameters.

Experiments are conducted and reported to demonstrate the role of the VTR target parameters in the model construction and its operation, and the superior performance of speaker adaptive learning. The distributional results of the scaling factors computed in the adaptive learning algorithm for all the 462 training speakers in TIMIT database are shown to demonstrate the wide variation of the VTR targets over speaker, both within and across genders. Typical speech utterances are then used to demonstrate that with the adaptively learned target parameters, both the VTR trajectory prediction and the cepstral trajectory prediction match real speech data much better than using speaker-independent training. The results show visually how the accuracy of the VTR and cepstral trajectory predictions depends upon the accuracy of the VTR targets. Further, a phonetic recognizer is constructed using the hidden trajectory model with two ways of determining the VTR target parameters. The recognizer is evaluated in a TIMIT phonetic recognition task and large-scale N-best rescoring paradigm is used for the evaluation. The results demonstrate a 14% phone error rate reduction using the model with speaker adaptation of targets compared with without such adaptation.

Although the present invention has been described with reference to particular embodiments, workers skilled in the art will recognize that changes may be made in form and detail without departing from the spirit and scope of the invention.

What is claimed is:

1. A computer-implemented method of training a hidden trajectory model, of a speech recognition system, which generates Vocal Tract Resonance (VTR) targets, the method comprising:
   obtaining initial VTR target parameters using speaker-independent training;
   storing the initial VTR target parameters as generic VTR target parameters;
   iteratively updating the generic VTR target parameters, for each of a plurality of speakers in a training set, using speaker-adaptive training to generate updated generic VTR target parameters, wherein iteratively updating the generic VTR target parameters, for each particular speaker of the plurality of speakers in the training set, further comprises iteratively scaling the generic VTR target parameters using a corresponding speaker-dependent scaling factor for the particular speaker to generate the updated generic VTR target parameters;
   storing the updated generic VTR target parameters on a computer storage medium, for use by a target selector to generate VTR sequences, as the generic VTR target parameters in order to configure the hidden trajectory model to perform speech recognition; and
   performing speech recognition using the configured hidden trajectory model.

2. The computer-implemented method of claim 1, and for each particular speaker in the training set, further comprising calculating, in each of a plurality of iterations, the corresponding speaker-dependent scaling factor.

3. The computer-implemented method of claim 2, and for each particular speaker, further comprising:
   generating speaker-dependent VTR target sequences as a function of the generic VTR target parameters and of the calculated speaker-dependent scaling factor corresponding to the particular user; and
   calculating HDM model scores using the generated speaker-dependent VTR target sequences.

4. The computer-implemented method of claim 2, and for each particular speaker in the training set, further comprising calculating the speaker-dependent scaling factor as a function of a ratio between averaged VTR frequencies over all frames of an utterance from the particular speaker, and averaged VTR frequencies over all frames in a full training set for a generic speaker.

5. The computer-implemented method of claim 2, and for each particular speaker in the training set, further comprising calculating the speaker-dependent scaling factor as a function of a ratio between normalized average VTR frequencies corresponding to vowels of an utterance from the particular speaker, and normalized average VTR frequencies corresponding to vowels for all speakers in a training set.

6. The computer-implemented method of claim 2, and for each particular speaker in the training set, further comprising calculating the speaker-dependent scaling factor as a function of a ratio between averaged VTR frequencies over all frames corresponding to vowels of an utterance from the particular speaker, and averaged VTR frequencies over all frames corresponding to vowels in a training set for a generic speaker.

7. The computer-implemented method of claim 6, wherein the training set for the generic speaker is from a formant tracker.

8. A computer storage medium storing computer-executable instructions for implementing steps of a method of training a hidden trajectory model, of a speech recognition system, which generates Vocal Tract Resonance (VTR) targets, the steps of the method comprising:
  retrieving generic VTR targets from a targets storage, wherein initial values of the generic VTR targets are obtained using speaker-independent training;
  iteratively updating the generic VTR targets, for each of a plurality of speakers in a training set, using speaker-adaptive training to generate updated generic VTR targets, wherein iteratively updating the generic VTR targets, for each particular speaker of the plurality of speakers in the training set, further comprises iteratively multiplying the generic VTR targets by a corresponding speaker-dependent scaling factor for the particular speaker to generate the updated generic VTR targets; and
  storing the updated generic VTR targets as the generic VTR targets, on the computer storage medium, for use by the speech recognition system in performing speech recognition; and
  performing speech recognition using the updated generic VTR targets.

9. The computer storage medium of claim 8, and for each particular speaker in the training set, further comprising calculating, in each of a plurality of iterations, the corresponding speaker-dependent scaling factor.

10. The computer storage medium of claim 9, and for each particular speaker, further comprising:
  generating speaker-dependent VTR target sequences as a function of the generic VTR targets and of the calculated speaker-dependent scaling factor corresponding to the particular user; and
  calculating HDM model scores using the generated speaker-dependent VTR target sequences.

11. The computer storage medium of claim 10, and for each particular speaker in the training set, further comprising calculating the speaker-dependent scaling factor as a function of a ratio between averaged VTR frequencies over all frames of an utterance from the particular speaker, and averaged VTR frequencies over all frames in a full training set for a generic speaker.

12. The computer storage medium of claim 10, and for each particular speaker in the training set, further comprising calculating the speaker-dependent scaling factor as a function of a ratio between normalized average VTR frequencies corresponding to vowels of an utterance from the particular speaker, and normalized average VTR frequencies corresponding to vowels for all speakers in a training set.

13. The computer storage medium of claim 10, and for each particular speaker in the training set, further comprising calculating the speaker-dependent scaling factor as a function of a ratio between averaged VTR frequencies over all frames corresponding to vowels of an utterance from the particular speaker, and averaged VTR frequencies over all frames corresponding to vowels in a training set for a generic speaker.

14. The computer storage medium of claim 13, wherein the training set for the generic speaker is from a formant tracker.

15. A computer-implemented method of training a hidden trajectory model, of a speech recognition system, which generates Vocal Tract Resonance (VTR) targets, the method comprising:
  retrieving generic VTR targets from a targets storage, wherein initial values of the generic VTR targets are obtained using speaker-independent training;
  iteratively calculating speaker-dependent scaling factors for each of a plurality of speakers in a training set;
  iteratively updating the generic VTR targets, for each of the plurality of speakers in the training set, using the corresponding calculated speaker-dependent scaling factors to generate updated generic VTR targets;
  storing the updated generic VTR targets, on a computer storage medium, as the generic VTR targets; and
  performing speech recognition using the updated generic VTR targets.

16. The computer-implemented method of claim 15, wherein iteratively calculating speaker-dependent scaling factors for each particular speaker further comprises calculating each speaker-dependent scaling factor as a function of a ratio between averaged VTR frequencies over all frames of an utterance from the particular speaker, and averaged VTR frequencies over all frames in a full training set for a generic speaker.

17. The computer-implemented method of claim 15, wherein iteratively calculating speaker-dependent scaling factors for each particular speaker further comprises calculating each speaker-dependent scaling factor as a function of a ratio between averaged VTR frequencies over all frames corresponding to vowels of an utterance from the particular speaker, and averaged VTR frequencies over all frames corresponding to vowels in a training set for a generic speaker.

18. The computer-implemented method of claim 15, wherein iteratively calculating speaker-dependent scaling factors for each particular speaker further comprises calculating each speaker-dependent scaling factor as a function of a ratio between normalized average VTR frequencies corresponding to vowels of an utterance from the particular speaker, and normalized average VTR frequencies corresponding to vowels for all speakers in a training set.

* * * * *